US011233416B2

(12) United States Patent
Tian et al.

(10) Patent No.: US 11,233,416 B2
(45) Date of Patent: *Jan. 25, 2022

(54) QUICK CHARGING METHOD BASED ON DETERMINATION OF TYPE OF POWER SUPPLY DEVICE WITHIN PRESET TIME PERIOD, TERMINAL, AND POWER SUPPLY DEVICE

(71) Applicant: GUANGDONG OPPO MOBILE TELECOMMUNICATIONS CORP., LTD., Guangdong (CN)

(72) Inventors: Chen Tian, Guangdong (CN); Jialiang Zhang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/705,544

(22) Filed: Dec. 6, 2019

(65) Prior Publication Data

US 2020/0144827 A1 May 7, 2020

Related U.S. Application Data

(63) Continuation of application No. 15/405,610, filed on Jan. 13, 2017, now Pat. No. 10,581,262, which is a
(Continued)

(51) Int. Cl.
*H02J 7/00* (2006.01)
*H04M 19/08* (2006.01)
*H04M 19/00* (2006.01)

(52) U.S. Cl.
CPC ............ *H02J 7/007* (2013.01); *H02J 7/0021* (2013.01); *H02J 7/0029* (2013.01);
(Continued)

(58) Field of Classification Search
CPC ........ H02J 7/007; H02J 7/0047; H02J 7/0029; H02J 7/0071; H02J 7/0021; H02J 7/0045; H04M 19/00; H04M 19/08
(Continued)

(56) References Cited

U.S. PATENT DOCUMENTS 4,196,417 A * 4/1980 Fasching ............... H04Q 9/14
340/12.31
4,471,435 A * 9/1984 Meisner ................ G01V 5/102
702/8
(Continued)

FOREIGN PATENT DOCUMENTS

CN 101471578 A 7/2009
CN 102957193 A 3/2013
(Continued)

OTHER PUBLICATIONS

Extended European Search Report issued in corresponding European application No. 16818967.8 dated Jan. 16, 2018.
(Continued)

*Primary Examiner* — John T Trischler
(74) *Attorney, Agent, or Firm* — Young Basile Hanlon & MacFarlane, P.C.

(57) ABSTRACT

A charging method is provided. The method includes the following. After a mobile terminal recognizes a type of a power adapter, the mobile terminal transmits indication information to the power adapter. The indication information is configured to indicate that the mobile terminal has recognized the type of the power adapter and instruct the power adapter to activate a quick charging process. The power adapter then negotiates with the mobile terminal via the quick charging process to determine charging parameters, and charges a battery of the mobile terminal in a multi-stage constant current mode.

13 Claims, 5 Drawing Sheets

Related U.S. Application Data continuation of application No. PCT/CN2016/070204, filed on Jan. 5, 2016.

(52) U.S. Cl.
CPC .......... *H02J 7/0045* (2013.01); *H02J 7/0047* (2013.01); *H02J 7/0071* (2020.01); *H04M 19/00* (2013.01); *H04M 19/08* (2013.01); *H02J 7/00* (2013.01); *H02J 7/0034* (2013.01); *H02J 7/00034* (2020.01); *H02J 7/00045* (2020.01)

(58) Field of Classification Search
USPC ......................................................... 320/106
See application file for complete search history.

(56) References Cited

U.S. PATENT DOCUMENTS

| | | | | |
|---|---|---|---|---|
| 4,673,861 A * | 6/1987 | Dubovsky | ................ | H04B 1/40 320/114 |
| 4,679,160 A * | 7/1987 | Whitener | ................ | G01W 1/14 340/621 |
| 4,684,872 A * | 8/1987 | Stewart | ................ | H02J 7/0021 320/125 |
| 5,103,156 A * | 4/1992 | Jones | ................ | H02J 7/0091 320/150 |
| 5,173,855 A * | 12/1992 | Nielsen | ................ | A01G 25/16 239/69 |
| 5,272,475 A * | 12/1993 | Eaton | ................ | G08B 6/00 320/155 |
| 5,521,512 A * | 5/1996 | Hulina | ................ | G01R 31/11 324/533 |
| 5,592,069 A * | 1/1997 | Dias | ................ | H01M 10/4257 320/106 |
| 5,694,024 A * | 12/1997 | Dias | ................ | H02J 7/00047 320/106 |
| 5,757,799 A * | 5/1998 | LaRue | ................ | H04L 49/102 370/417 |
| 5,812,879 A * | 9/1998 | Moro | ................ | G06F 13/385 710/62 |
| 5,867,006 A * | 2/1999 | Dias | ................ | G01K 7/13 320/106 |
| 6,018,228 A * | 1/2000 | Dias | ................ | H02J 7/00036 320/106 |
| 6,222,347 B1 * | 4/2001 | Gong | ................ | G06F 1/263 320/134 |
| 6,282,611 B1 * | 8/2001 | Hamamoto | ................ | G07F 7/1008 711/115 |
| 6,285,962 B1 * | 9/2001 | Hunter | ................ | G11C 29/56 702/117 |
| 6,445,936 B1 | 9/2002 | Cannon et al. | | |
| 6,480,799 B2 * | 11/2002 | Hunter | ................ | G11C 29/56 702/117 |
| 6,667,624 B1 * | 12/2003 | Raichle | ................ | G01R 31/367 324/522 |
| 6,784,637 B2 * | 8/2004 | Raichle | ................ | H02J 7/00047 320/107 |
| 6,842,707 B2 * | 1/2005 | Raichle | ................ | G06F 8/65 320/125 |
| 6,946,817 B2 * | 9/2005 | Fischer | ................ | H02J 7/0027 320/132 |
| 6,969,970 B2 * | 11/2005 | Dias | ................ | G01K 7/13 320/106 |
| 6,986,082 B2 * | 1/2006 | Hsiao | ................ | G11C 29/48 324/762.01 |
| 7,076,375 B2 * | 7/2006 | Raichle | ................ | H02J 7/00 702/63 |
| 7,148,657 B2 * | 12/2006 | Raichle | ................ | H02J 7/0069 320/162 |
| 7,259,539 B2 * | 8/2007 | Suzuki | ................ | H02J 7/00047 320/110 |
| 7,307,385 B2 * | 12/2007 | Yamamoto | ................ | H05B 45/50 315/224 |
| 7,498,772 B2 * | 3/2009 | Palladino | ................ | H02J 7/1461 320/132 |
| 7,573,159 B1 * | 8/2009 | Deluliis | ................ | H02J 7/0042 307/150 |
| 7,629,775 B2 * | 12/2009 | Nishida | ................ | H01M 10/44 320/136 |
| 7,631,111 B2 | 12/2009 | Monks et al. | | |
| 7,672,798 B2 * | 3/2010 | Raichle | ................ | H01M 10/486 702/63 |
| 7,737,657 B2 * | 6/2010 | Fischer | ................ | H02J 7/022 320/111 |
| 7,904,625 B1 * | 3/2011 | Jiang | ................ | G06F 13/4081 710/110 |
| 7,956,330 B2 * | 6/2011 | Nishino | ................ | A61B 6/56 250/370.09 |
| 8,013,568 B2 * | 9/2011 | Park | ................ | H02J 7/00304 320/108 |
| 8,049,462 B2 * | 11/2011 | Kung | ................ | H02J 7/0031 320/111 |
| 8,080,979 B2 * | 12/2011 | Abe | ................ | H01M 10/425 320/134 |
| 8,148,940 B2 * | 4/2012 | Liu | ................ | H02J 7/342 320/114 |
| 8,180,584 B2 * | 5/2012 | Raichle | ................ | H01M 10/46 702/63 |
| 8,198,861 B2 * | 6/2012 | Kudou | ................ | H01R 13/665 320/114 |
| 8,258,750 B2 * | 9/2012 | Yamada | ................ | H02J 7/0071 320/128 |
| 8,259,221 B1 * | 9/2012 | Kaplan | ................ | H02J 2207/40 348/372 |
| 8,289,000 B2 * | 10/2012 | Nishida | ................ | H02J 7/045 320/145 |
| 8,447,893 B2 * | 5/2013 | Tauscher | ................ | G06F 13/387 710/16 |
| 8,548,659 B2 * | 10/2013 | Tanaka | ................ | B60L 53/11 701/22 |
| 8,725,338 B2 * | 5/2014 | Tanaka | ................ | B60L 1/006 701/22 |
| 8,892,912 B2 * | 11/2014 | Lai | ................ | G06F 1/266 713/300 |
| 8,941,129 B1 * | 1/2015 | Gershowitz | ................ | H01L 33/486 257/88 |
| 8,941,361 B2 * | 1/2015 | Bae | ................ | G06F 1/266 320/137 |
| 8,975,821 B2 * | 3/2015 | Gershowitz | ................ | H05B 45/44 315/186 |
| 9,153,995 B2 * | 10/2015 | Walley | ................ | G06F 1/26 |
| 9,155,145 B2 * | 10/2015 | Gershowitz | ................ | H01L 33/62 |
| 9,158,325 B1 | 10/2015 | Lim | | |
| 9,246,554 B2 * | 1/2016 | Maguire | ................ | H04W 52/0261 |
| 9,247,594 B2 * | 1/2016 | Gershowitz | ................ | H01L 25/0753 |
| 9,291,654 B2 * | 3/2016 | LeMay | ................ | A61B 5/7221 |
| 9,351,358 B2 * | 5/2016 | Gershowitz | ................ | H05B 45/50 |
| 9,356,460 B2 * | 5/2016 | Wong | ................ | H02J 2207/40 |
| 9,395,778 B2 * | 7/2016 | Fritchman | ................ | H02J 7/00047 |
| 9,438,064 B2 * | 9/2016 | Keeling | ................ | H04B 5/0081 |
| 9,468,052 B2 * | 10/2016 | Gershowitz | ................ | H01L 25/167 |
| 9,509,160 B2 * | 11/2016 | Zhao | ................ | H02J 7/007 |
| 9,509,161 B2 * | 11/2016 | Son | ................ | H02J 7/007 |
| 9,614,446 B2 * | 4/2017 | Bisschop | ................ | H02J 7/02 |
| 9,621,054 B2 * | 4/2017 | Miyamoto | ................ | H02M 3/33507 |
| 9,634,517 B2 * | 4/2017 | Davis | ................ | H02J 7/00 |
| 9,698,693 B2 * | 7/2017 | An | ................ | H02M 3/1588 |
| 9,716,401 B2 * | 7/2017 | Wojcik | ................ | H02J 7/025 |
| 9,728,995 B2 * | 8/2017 | Matsumura | ................ | H02J 7/0029 |
| 9,730,284 B2 * | 8/2017 | Gershowitz | ................ | H01L 25/167 |
| 9,755,450 B2 * | 9/2017 | Wu | ................ | H02J 7/00036 |
| 9,824,045 B2 * | 11/2017 | Waters | ................ | G06F 1/266 |
| 9,859,740 B2 * | 1/2018 | Chi | ................ | H02J 7/00047 |
| 9,864,421 B2 * | 1/2018 | Li | ................ | G06F 13/4068 |
| 9,866,229 B2 * | 1/2018 | Huang | ................ | H02M 3/00 |
| 9,871,393 B2 * | 1/2018 | Hao | ................ | H02J 7/0091 |
| 9,893,547 B2 * | 2/2018 | Wu | ................ | H02J 7/0029 |
| 9,899,848 B2 * | 2/2018 | Hu | ................ | H02J 7/0036 |

(56) References Cited

U.S. PATENT DOCUMENTS

| | | | | |
|---|---|---|---|---|
| 9,941,808 B2* | 4/2018 | Walley | H02J 50/12 |
| 9,944,192 B2* | 4/2018 | Ricci | H02J 7/0045 |
| 9,948,087 B2* | 4/2018 | Haines | H02H 3/16 |
| 9,948,134 B2* | 4/2018 | Wojcik | H02J 50/12 |
| 9,985,449 B2* | 5/2018 | Zhang | G06F 1/206 |
| 9,998,611 B2* | 6/2018 | Zhang | H02J 7/0068 |
| 10,014,706 B2* | 7/2018 | Loonen | H01M 10/443 |
| 10,044,204 B2* | 8/2018 | Hu | H02J 7/0044 |
| 10,044,217 B2* | 8/2018 | Huang | H02J 7/045 |
| 10,084,333 B2* | 9/2018 | Zeng | H02J 7/007192 |
| 10,090,700 B2* | 10/2018 | Zhang | H02J 7/045 |
| 10,097,022 B2* | 10/2018 | Li | H02J 7/00036 |
| 10,097,032 B2* | 10/2018 | Hu | H02J 7/00038 |
| 10,116,351 B2* | 10/2018 | Kim | H04B 3/46 |
| 10,122,190 B2* | 11/2018 | Zhang | H01R 31/06 |
| 10,122,201 B2* | 11/2018 | Zhang | H02J 7/00712 |
| 10,128,677 B2* | 11/2018 | Tian | H02J 7/0071 |
| 10,135,263 B2* | 11/2018 | Jung | H02J 7/0071 |
| 10,135,277 B2* | 11/2018 | Heo | G01R 31/3835 |
| 10,141,766 B2* | 11/2018 | Zhang | H02J 7/00714 |
| 10,148,096 B2* | 12/2018 | Muratov | H02J 50/10 |
| 10,148,113 B2* | 12/2018 | Zhang | H02J 7/0068 |
| 10,181,745 B2* | 1/2019 | Zhang | H02J 7/00 |
| 10,186,881 B2* | 1/2019 | York | H02J 7/0036 |
| 10,193,368 B2* | 1/2019 | Zhang | H02J 7/045 |
| 10,211,655 B2* | 2/2019 | Wu | H02J 7/0031 |
| 10,211,659 B2* | 2/2019 | Tian | H01M 10/44 |
| 10,211,661 B2* | 2/2019 | Kim | G01R 31/3835 |
| 10,256,652 B2* | 4/2019 | Zhang | H02J 7/06 |
| 10,270,269 B2* | 4/2019 | Zhang | H02J 7/00 |
| 10,277,053 B2* | 4/2019 | Zhang | H02J 7/0029 |
| 10,291,043 B2* | 5/2019 | Zhang | H02M 1/08 |
| 10,291,050 B2* | 5/2019 | Zhang | H02M 7/04 |
| 10,291,060 B2* | 5/2019 | Tian | H02J 7/027 |
| 10,320,206 B2* | 6/2019 | Zhang | H02J 7/0069 |
| 10,320,225 B2* | 6/2019 | Tian | H02M 3/33576 |
| 10,326,291 B2* | 6/2019 | Zhang | H02J 7/0036 |
| 10,326,297 B2* | 6/2019 | Zhang | H02M 3/33523 |
| 10,333,326 B2* | 6/2019 | Xiao | G01R 19/30 |
| 10,333,331 B2* | 6/2019 | Zhang | H02J 7/00714 |
| 10,340,717 B2* | 7/2019 | Zhang | H02J 7/00711 |
| 10,340,718 B2* | 7/2019 | Zhang | H02M 1/00 |
| 10,340,727 B2* | 7/2019 | Zhang | H02J 7/008 |
| 10,348,119 B2* | 7/2019 | Tian | H02M 3/33569 |
| 10,348,121 B2* | 7/2019 | Zhang | H01F 27/425 |
| 10,367,365 B2* | 7/2019 | Wu | H02J 7/0031 |
| 10,381,860 B2* | 8/2019 | Tian | H02J 7/00712 |
| 10,381,861 B2* | 8/2019 | Zhang | H02J 7/0013 |
| 10,389,153 B2* | 8/2019 | Liao | H02J 7/0071 |
| 10,389,164 B2* | 8/2019 | Tian | H02J 7/007 |
| 10,404,083 B2* | 9/2019 | Zhang | H02J 7/0044 |
| 10,411,490 B2* | 9/2019 | Melgar | H02J 7/00 |
| 10,411,494 B2* | 9/2019 | Tian | H02J 7/045 |
| 10,411,496 B2* | 9/2019 | Zhang | H02J 7/0071 |
| 10,424,953 B2* | 9/2019 | Zeng | H02J 7/0021 |
| 10,424,954 B2* | 9/2019 | Zhang | H02J 7/0029 |
| 10,424,958 B2* | 9/2019 | Tian | H01M 10/0525 |
| 10,454,288 B2* | 10/2019 | Zhang | G06F 1/26 |
| 10,461,549 B2* | 10/2019 | Hu | H02J 7/00 |
| 10,461,568 B2* | 10/2019 | Zhang | H02M 3/33507 |
| 10,491,030 B2* | 11/2019 | Tian | H02J 7/0029 |
| 10,505,380 B2* | 12/2019 | Zhang | H02J 7/00 |
| 10,516,290 B2* | 12/2019 | Zhang | H02J 7/00043 |
| 10,536,006 B2* | 1/2020 | Zhang | H02J 7/00714 |
| 10,541,553 B2* | 1/2020 | Tian | H02J 7/06 |
| 10,554,067 B2* | 2/2020 | Zhang | H02J 7/06 |
| 10,566,827 B2* | 2/2020 | Tian | G01R 31/3842 |
| 10,566,828 B2* | 2/2020 | Tian | H01M 10/44 |
| 10,566,829 B2* | 2/2020 | Tian | H02M 1/08 |
| 10,574,074 B2* | 2/2020 | Jung | G06F 1/26 |
| 10,581,264 B2* | 3/2020 | Tian | H01M 10/425 |
| 10,622,821 B2* | 4/2020 | Chen | H02J 7/007192 |
| 10,622,829 B2* | 4/2020 | Zhang | H02J 7/00 |
| 10,630,096 B2* | 4/2020 | Zhang | H02J 7/00 |
| 10,637,276 B2* | 4/2020 | Tian | H02J 7/06 |
| 10,644,529 B2* | 5/2020 | Tian | H01M 10/44 |
| 10,644,530 B2* | 5/2020 | Tian | H02J 7/008 |
| 10,651,677 B2* | 5/2020 | Chen | H02J 7/00714 |
| 10,658,854 B2* | 5/2020 | Zhang | H01M 10/486 |
| 10,666,072 B2* | 5/2020 | Zhang | H02J 7/007 |
| 10,673,261 B2* | 6/2020 | Zeng | H02J 7/007 |
| 10,680,460 B2* | 6/2020 | Zhang | H02J 7/0042 |
| 10,707,688 B2* | 7/2020 | Kang | H02J 7/007 |
| 10,714,963 B2* | 7/2020 | Tian | H02M 7/04 |
| 10,727,679 B2* | 7/2020 | Zhang | H02J 7/0068 |
| 10,727,687 B2* | 7/2020 | Zhang | H02M 3/156 |
| 10,749,371 B2* | 8/2020 | Zhang | H04M 19/00 |
| 10,819,124 B2* | 10/2020 | Li | H02J 7/0024 |
| 2001/0045813 A1* | 11/2001 | Suzuki | H02J 7/00047 320/110 |
| 2002/0032537 A1* | 3/2002 | Hunter | G11C 29/56 702/117 |
| 2002/0117993 A1* | 8/2002 | Dias | H01M 10/425 320/106 |
| 2003/0005372 A1* | 1/2003 | Hsiao | G11C 29/56 714/718 |
| 2003/0054703 A1* | 3/2003 | Fischer | H02J 7/0027 439/894 |
| 2003/0189417 A1* | 10/2003 | Dias | H02J 7/00047 320/134 |
| 2004/0000891 A1* | 1/2004 | Raichle | G01R 31/3648 320/107 |
| 2004/0000893 A1* | 1/2004 | Raichle | H02J 7/0069 320/135 |
| 2004/0095020 A1* | 5/2004 | Kernahan | H02M 3/156 307/35 |
| 2005/0057098 A1* | 3/2005 | Bouchon | B60K 6/28 307/10.1 |
| 2005/0151505 A1* | 7/2005 | Dias | H01M 10/4257 320/106 |
| 2006/0284595 A1* | 12/2006 | Hsieh | H02J 7/00712 320/115 |
| 2006/0284599 A1* | 12/2006 | Hsieh | H02J 7/0071 320/128 |
| 2007/0075683 A1* | 4/2007 | Chung | H02J 7/0068 320/128 |
| 2007/0236181 A1* | 10/2007 | Palladino | G01R 31/3651 320/130 |
| 2007/0278990 A1* | 12/2007 | Raichle | H02J 7/022 320/104 |
| 2007/0278999 A1* | 12/2007 | Hsia | H02J 7/00 320/111 |
| 2008/0042616 A1* | 2/2008 | Monks | H04L 12/10 320/106 |
| 2008/0224669 A1* | 9/2008 | Nishida | H01M 10/48 320/165 |
| 2008/0272741 A1* | 11/2008 | Kanamori | H02J 7/00 320/137 |
| 2008/0303479 A1* | 12/2008 | Park | H02J 50/90 320/108 |
| 2009/0085528 A1* | 4/2009 | Yamada | H01M 10/44 320/160 |
| 2009/0130874 A1* | 5/2009 | Englund | H01R 29/00 439/131 |
| 2009/0167252 A1* | 7/2009 | Abe | H01M 10/486 320/152 |
| 2009/0206796 A1* | 8/2009 | Pacholok | H02J 7/02 320/145 |
| 2009/0206800 A1* | 8/2009 | Kudou | H01R 13/713 320/162 |
| 2010/0153039 A1* | 6/2010 | Raichle | H01M 10/486 702/63 |
| 2010/0225269 A1* | 9/2010 | Liu | H01M 10/44 320/107 |
| 2010/0320973 A1* | 12/2010 | Nishida | H02J 7/0071 320/145 |
| 2011/0000726 A1* | 1/2011 | Tanaka | B60W 10/26 180/65.265 |
| 2011/0181110 A1* | 7/2011 | Walley | H02J 50/80 307/31 |

(56) References Cited

U.S. PATENT DOCUMENTS

| | | | |
|---|---|---|---|
| 2012/0087078 A1* | 4/2012 | Medica | G06F 1/1632 361/679.31 |
| 2012/0210146 A1* | 8/2012 | Lai | G06F 1/266 713/310 |
| 2012/0309295 A1* | 12/2012 | Maguire | H02J 50/10 455/39 |
| 2013/0147433 A1* | 6/2013 | Chen | H02J 7/0013 320/112 |
| 2013/0285599 A1 | 10/2013 | Hao | |
| 2013/0314040 A1* | 11/2013 | Tanaka | B60K 6/48 320/109 |
| 2014/0049209 A1* | 2/2014 | Chang | G06F 1/266 320/107 |
| 2014/0081493 A1* | 3/2014 | Shemyakin | B60L 15/00 701/22 |
| 2014/0113561 A1* | 4/2014 | Maguire | H02J 50/20 455/41.2 |
| 2014/0136863 A1* | 5/2014 | Fritchman | H02J 7/00036 713/310 |
| 2014/0145675 A1* | 5/2014 | Shimizu | H04B 5/0075 320/108 |
| 2014/0254050 A1 | 9/2014 | Haines et al. | |
| 2014/0257119 A1 | 9/2014 | Lemay | |
| 2014/0285109 A1* | 9/2014 | Liao | H05B 45/3725 315/291 |
| 2014/0300321 A1* | 10/2014 | Kim | H02J 7/00047 320/111 |
| 2014/0362609 A1* | 12/2014 | Bisschop | H02M 3/33523 363/21.12 |
| 2015/0002079 A1* | 1/2015 | Jeong | H02J 7/04 320/107 |
| 2015/0021629 A1* | 1/2015 | Gershowitz | H01L 25/167 257/88 |
| 2015/0022088 A1* | 1/2015 | Gershowitz | F21V 23/02 315/113 |
| 2015/0022101 A1* | 1/2015 | Gershowitz | F21K 9/20 315/186 |
| 2015/0035477 A1* | 2/2015 | Wong | H02J 7/007 320/107 |
| 2015/0054406 A1* | 2/2015 | Gershowitz | H01L 25/167 315/113 |
| 2015/0061578 A1* | 3/2015 | Keeling | H02J 7/025 320/108 |
| 2015/0123597 A1* | 5/2015 | Son | H02J 7/007 320/107 |
| 2015/0130417 A1 | 5/2015 | Song et al. | |
| 2015/0145415 A1* | 5/2015 | Gershowitz | H01L 33/62 315/113 |
| 2015/0155729 A1* | 6/2015 | Lee | H02J 7/0044 320/114 |
| 2015/0180244 A1 | 6/2015 | Jung et al. | |
| 2015/0194839 A1 | 7/2015 | Wojcik et al. | |
| 2015/0236528 A1* | 8/2015 | Kim | G01R 17/00 320/107 |
| 2015/0236547 A1* | 8/2015 | Davis | H02J 7/042 320/111 |
| 2015/0263550 A1* | 9/2015 | Han | H02J 7/0014 320/108 |
| 2015/0301552 A1* | 10/2015 | Lim | G01K 7/16 327/538 |
| 2015/0357836 A1* | 12/2015 | Zhao | H02J 7/007 320/162 |
| 2015/0372521 A1* | 12/2015 | Lin | H02J 7/0047 320/107 |
| 2015/0377466 A1* | 12/2015 | Gershowitz | F21V 23/02 362/382 |
| 2016/0043586 A1* | 2/2016 | Wang | H02J 7/00 320/107 |
| 2016/0043650 A1* | 2/2016 | Walley | H02J 7/02 363/13 |
| 2016/0068073 A1* | 3/2016 | Taylor | B60L 53/11 320/109 |
| 2016/0098046 A1* | 4/2016 | Jutras | H05B 47/19 320/107 |
| 2016/0105038 A1 | 4/2016 | Chi | |
| 2016/0117274 A1* | 4/2016 | Waters | G06F 13/362 710/106 |
| 2016/0118824 A1* | 4/2016 | Han | H02J 13/0062 320/114 |
| 2016/0126758 A1* | 5/2016 | Wu | H02J 7/0031 320/162 |
| 2016/0149493 A1* | 5/2016 | An | H02M 3/1588 323/235 |
| 2016/0209347 A1* | 7/2016 | Kim | H04B 3/46 |
| 2016/0218535 A1* | 7/2016 | Prete | H02J 7/0044 |
| 2016/0255690 A1* | 9/2016 | Gershowitz | H01L 25/0753 315/186 |
| 2016/0301226 A1* | 10/2016 | Matsumura | H02J 7/0029 |
| 2016/0336779 A1* | 11/2016 | Hu | H02J 7/0045 |
| 2016/0344210 A1 | 11/2016 | Zhang | |
| 2016/0344211 A1* | 11/2016 | Zhang | H01R 31/06 |
| 2016/0344218 A1* | 11/2016 | Zhang | H02J 7/0072 |
| 2016/0352132 A1* | 12/2016 | Zhang | H02J 7/06 |
| 2016/0359340 A1* | 12/2016 | Zhao | H02J 7/0021 |
| 2016/0370835 A1* | 12/2016 | Erickson | G06F 13/385 |
| 2016/0372963 A1* | 12/2016 | Sankar | H02J 50/80 |
| 2017/0040805 A1 | 2/2017 | Huang et al. | |
| 2017/0040810 A1* | 2/2017 | Hu | H02J 7/00 |
| 2017/0040817 A1* | 2/2017 | Hu | H02J 7/0047 |
| 2017/0040821 A1* | 2/2017 | Li | H02J 7/007184 |
| 2017/0047852 A1* | 2/2017 | Huang | H02J 7/00 |
| 2017/0054286 A9* | 2/2017 | Haines | G01R 31/50 |
| 2017/0093189 A1* | 3/2017 | Zeng | H02J 7/007 |
| 2017/0098942 A1* | 4/2017 | Zeng | H04M 19/08 |
| 2017/0117728 A1* | 4/2017 | Zhang | H02J 7/0047 |
| 2017/0136902 A1* | 5/2017 | Ricci | B60L 53/36 |
| 2017/0149252 A1* | 5/2017 | Zhang | G06F 1/206 |
| 2017/0194799 A1* | 7/2017 | Tian | H02J 7/0071 |
| 2017/0194805 A1* | 7/2017 | Kong | H02J 7/00036 |
| 2017/0207648 A1* | 7/2017 | Xiao | G01R 19/30 |
| 2017/0222459 A1* | 8/2017 | Kang | H01R 31/065 |
| 2017/0244264 A1* | 8/2017 | Zhang | H04W 24/02 |
| 2017/0250555 A1* | 8/2017 | Zhang | H02J 7/0072 |
| 2017/0256961 A1* | 9/2017 | Zeng | H02J 7/007194 |
| 2017/0271887 A1* | 9/2017 | Heo | H02J 7/04 |
| 2017/0279295 A1* | 9/2017 | Wojcik | H02J 50/90 |
| 2017/0338667 A1* | 11/2017 | Loonen | H02J 7/007 |
| 2018/0046591 A1* | 2/2018 | Waters | G06F 1/266 |
| 2018/0054589 A1* | 2/2018 | Park | G09G 5/006 |
| 2018/0090946 A1* | 3/2018 | Melgar | H02J 7/00 |
| 2018/0102667 A1* | 4/2018 | Choi | H04B 5/0037 |
| 2018/0131195 A1* | 5/2018 | Wu | H02J 7/007 |
| 2018/0138724 A1* | 5/2018 | Hu | H02J 7/0036 |
| 2018/0145517 A1* | 5/2018 | Krishna | H02J 7/00712 |
| 2018/0166889 A1* | 6/2018 | Xu | H02J 7/007 |
| 2018/0175637 A1* | 6/2018 | Zhang | H02J 7/00047 |
| 2018/0205322 A1* | 7/2018 | Walley | H02J 7/022 |
| 2018/0241238 A1* | 8/2018 | Zhang | H02M 7/04 |
| 2018/0269697 A1* | 9/2018 | Zhang | H02J 7/00036 |
| 2018/0269700 A1* | 9/2018 | Tian | H02J 7/022 |
| 2018/0278070 A1* | 9/2018 | Zhang | H02J 7/02 |
| 2018/0358818 A1* | 12/2018 | Zhang | H02J 7/0029 |
| 2018/0364291 A1* | 12/2018 | Zhang | H04M 1/72527 |
| 2019/0001828 A1* | 1/2019 | Ko | G05D 23/19 |
| 2019/0036351 A1* | 1/2019 | Tian | H02J 7/0036 |
| 2019/0036361 A1* | 1/2019 | Zhang | H02J 7/0069 |
| 2019/0089174 A1* | 3/2019 | Zeng | H02J 7/0047 |
| 2019/0089175 A1* | 3/2019 | Zhang | H02J 7/00 |
| 2019/0126761 A1* | 5/2019 | Verbridge | H01M 50/502 |
| 2019/0214833 A1* | 7/2019 | Li | H02J 7/00718 |
| 2019/0214837 A1* | 7/2019 | Kristjansson | H02J 7/0013 |
| 2019/0305573 A1* | 10/2019 | Xiao | H02J 7/00 |
| 2019/0389314 A1* | 12/2019 | Zhu | B60L 53/11 |
| 2019/0389315 A1* | 12/2019 | Zhu | B60L 53/14 |
| 2020/0106285 A1* | 4/2020 | Tian | H02J 7/0047 |

(56) References Cited

U.S. PATENT DOCUMENTS

| | | | | |
|---|---|---|---|---|
| 2020/0262303 A1* | 8/2020 | Dow | ...................... | B60L 53/20 |
| 2020/0274375 A1* | 8/2020 | Griffiths | ................ | H02J 7/1423 |

FOREIGN PATENT DOCUMENTS

| | | | |
|---|---|---|---|
| CN | 103066340 | A | 4/2013 |
| CN | 103475068 | A | 12/2013 |
| CN | 103762702 | A | 4/2014 |
| CN | 103779907 | A | 5/2014 |
| CN | 104065147 | A | 9/2014 |
| CN | 104092274 | A | 10/2014 |
| CN | 104135057 | A | 11/2014 |
| CN | 104701583 | A | 6/2015 |
| CN | 104810877 | A | 7/2015 |
| CN | 104810879 | A | 7/2015 |
| CN | 103066340 | B | 8/2015 |
| CN | 104967199 | A | 10/2015 |
| CN | 104967201 | A | 10/2015 |
| CN | 105098883 | A | 11/2015 |
| CN | 105098900 | A | 11/2015 |
| CN | 105140985 | A | 12/2015 |
| JP | 2007327772 | A | 12/2007 |
| JP | 2012034554 | A | 2/2012 |
| JP | 2012211860 | A | 11/2012 |
| JP | 2013198262 | A | 9/2013 |
| TW | I353098 | B | 11/2011 |
| TW | 201424190 | A | 6/2014 |
| WO | 2013167076 | A2 | 11/2013 |
| WO | 2013178191 | A2 | 12/2013 |
| WO | 2014077978 | A1 | 5/2014 |
| WO | 2015113463 | A1 | 8/2015 |

OTHER PUBLICATIONS

Extended European search report issued in corresponding European application No. 18191449.0 dated Nov. 15, 2018.
Indian Examination Report issued in corresponding Indian application No. 201737000892 dated Apr. 30, 2019.
International search report issued in corresponding international application No. PCT/CN2016/070204 dated May 27, 2016.
Examination report No. 1 issued in corresponding AU application No. 2015345832 dated Jul. 28, 2017.
First office action with English Translation issued in corresponding CN application No. 201580004640.2 dated Aug. 2, 2017.
Third office action with English Translation issued in corresponding CN application No. 201580004640.2 dated Feb. 26, 2018.
Extended European search report issued in corresponding European application No. 15858612.3 dated Dec. 14, 2017.
Communication pursuant to Article 94(3) EPC issued in corresponding European application No. 15858612.3 dated Feb. 18, 2020.
Examination report issued in corresponding IN application No. 201637042899 dated Apr. 8, 2019.
Notice of Reasons for Refusal with English Translation issued in corresponding JP application No. 2016-573754 dated Jan. 9, 2018.
Notice of Reasons for Refusal with English Translation issued in corresponding JP application No. 2016-573754 dated Mar. 13, 2018.
Notice of Reasons for Refusal with English Translation issued in corresponding JP application No. 2016-573754 dated Jul. 30, 2019.
Notification of Reason for Refusal with English Translation issued in corresponding KR application No. 2018-7023953 dated Oct. 17, 2018.
Notice of allowance with English Translation issued in corresponding KR application No. 2018-7023953 dated Apr. 23, 2019.
Examination report issued in corresponding MY application No. PI 2016704091 dated Sep. 18, 2019.
Written Opinion issued in corresponding SG application No. 11201609424T dated Sep. 13, 2017.
Notice of allowance issued in corresponding SG application No. 11201609424T dated Jul. 31, 2018.
Non final rejection issued in corresponding U.S. Appl. No. 15/311,349 dated Dec. 11, 2018.
Final rejection issued in corresponding U.S. Appl. No. 15/311,349 dated Apr. 25, 2019.
Non final rejection issued in corresponding U.S. Appl. No. 16/196,474 dated Mar. 4, 2019.
Final rejection issued in corresponding U.S. Appl. No. 16/196,474 dated Jun. 12, 2019.
Non final rejection issued in corresponding U.S. Appl. No. 16/196,474 dated Aug. 28, 2019.
Final rejection issued in corresponding U.S. Appl. No. 16/196,474 dated Nov. 27, 2019.
Non final rejection issued in corresponding U.S. Appl. No. 16/849,773 dated Jun. 22, 2020.
International search report with English Translation issued in corresponding international application No. PCT/CN2015/078898 dated Aug. 17, 2015.
Communication pursuant to Article 94(3) EPC for EP Application 15858612.3 dated Jun. 1, 2021. (4 pages).
Extended European search report issued in corresponding European application No. 21195275.9 dated Dec. 1, 2021.

* cited by examiner

QUICK CHARGING METHOD BASED ON DETERMINATION OF TYPE OF POWER SUPPLY DEVICE WITHIN PRESET TIME PERIOD, TERMINAL, AND POWER SUPPLY DEVICE

CROSS-REFERENCE TO RELATED APPLICATION(S)

This application is a continuation of U.S. application Ser. No. 15/405,610, filed on Jan. 13, 2017, which is a continuation of PCT Patent Application No. PCT/CN2016/070204, filed on Jan. 5, 2016, the contents of both of which are hereby incorporated by reference in their entireties.

TECHNICAL FIELD

The present disclosure relates to the field of charging, and more particularly to a quick charging method, a mobile terminal, and a power adapter.

BACKGROUND

Presently, mobile terminals (e.g., smart phones) become more and more popular with consumers. However, the power consumption of mobile terminals is great, thus mobile terminals need to be charged frequently. As the battery capacity of mobile terminals becomes greater and greater, correspondingly, the charging time becomes longer. How to realize quick charging is a problem that needs to be solved instantly.

In the present technology, to achieve the purpose of quick charging, the output current of a power adapter is directly increased without consideration of endurance of a mobile terminal, which will result in a phenomenon of overheat or even burnout of the mobile terminal, and reduces the lifespan of the mobile terminal.

SUMMARY

The embodiments of the present disclosure provide a quick charging method, a power adaptor, and a mobile terminal, which can increase security of a quick charging process.

In a first aspect, a quick charging method is provided. The method is applied in a mobile terminal. The mobile terminal is coupled to a power adapter via a universal serial bus (USB) interface, a power line of the USB interface is used for charging a battery of the mobile terminal, and data lines of the USB interface are used for communication between the mobile terminal and the power adapter. The mobile terminal supports a normal charging mode and a quick charging mode, and a charging speed of the quick charging mode is greater than that of the normal charging mode. The method comprises: determining, by the mobile terminal, a type of the power adapter when it is determined that the power adapter is coupled to the mobile terminal; transmitting, by the mobile terminal, indication information to the power adapter when it is determined that the power adapter is a non-USB power adapter, the indication information being configured to indicate that the mobile terminal has recognized the type of the power adapter and instruct the power adapter to activate a quick charging communication process; receiving, by the mobile terminal, a first instruction from the power adapter after the power adapter activates the quick charging communication process, the first instruction being configured to query whether the mobile terminal agrees to charge the battery of the mobile terminal in the quick charging mode; transmitting, by the mobile terminal, a reply instruction of the first instruction to the power adapter, the reply instruction of the first instruction being configured to indicate that the mobile terminal agrees to charge the battery in the quick charging mode; conducting, by the mobile terminal, a handshake communication with the power adapter via a second instruction transmitted by the power adapter to determine a charging voltage of the quick charging mode; conducting, by the mobile terminal, a handshake communication with the power adapter via a third instruction transmitted by the power adapter to determine a charging current of the quick charging mode; and conducting, by the mobile terminal, a handshake communication with the power adapter via a fourth instruction transmitted by the power adapter when the power adapter adjusts an output voltage and an output current of the power adapter to be the charging voltage and the charging current of the quick charging mode and enters a constant current phase, so as to cause the power adapter to adjust the output current to charge the battery in a multi-stage constant current mode.

In a second aspect, a quick charging method is provided. The quick charging method is applied in a power adapter. The power adapter is coupled to a mobile terminal via a USB interface, a power line of the USB interface is used for the power adapter to charge a battery of the mobile terminal, and data lines of the USB interface are used for communication between the power adapter and the mobile terminal. The power adapter supports a normal charging mode and a quick charging mode, and a charging speed of the quick charging mode being greater than that of the normal charging mode. The method comprises: activating, by the power adapter, a quick charging communication process when the power adapter receives indication information for indicating that the mobile terminal has recognized a type of the power adapter from the mobile terminal, and transmitting, by the power adapter, a first instruction to the mobile terminal, the first instruction being configured to query whether the mobile terminal agrees to charge the battery in the quick charging mode; receiving, by the power adapter, a reply instruction of the first instruction from the mobile terminal, the reply instruction of the first instruction being configured to indicate that the mobile terminal agrees to charge the battery in the quick charging mode; conducting, by the power adapter, a handshake communication with the mobile terminal via a second instruction to determine a charging voltage of the quick charging mode; conducting, by the power adapter, a handshake communication with the mobile terminal via a third instruction to determine a charging current of the quick charging mode; and adjusting, by the power adapter, an output voltage and an output current of the power adapter to be the charging voltage and the charging current of the quick charging mode to enter a constant current phase; and conducting, by the power adapter, a handshake communication with the mobile terminal via a fourth instruction during the constant current phase to adjust the output current of the power adapter, so as to charge the mobile terminal in a multi-stage constant current mode.

In a third aspect, a mobile terminal is provided. The mobile terminal is coupled to a power adapter via a USB interface. A power line of the USB interface is used for charging a battery of the mobile terminal, and data lines of the USB interface are used for communication between the mobile terminal and the power adapter. The mobile terminal supports a normal charging mode and a quick charging mode, and a charging speed of the quick charging mode is greater than that of the normal charging mode. The mobile terminal comprises: a charging circuit; and a communication control circuit configured to determine a type of the power adapter when it is determined that the power adapter is coupled to the mobile terminal, transmit indication information to the power adapter when it is determined that the power adapter is a non-USB power adapter, wherein the indication information is configured to indicate that the mobile terminal has recognized the type of the power adapter and instruct the power adapter to activate a quick charging communication process. The communication control circuit is further configured to receive a first instruction from the power adapter after the power adapter activates the quick charging communication process, and the first instruction is configured to query whether the mobile terminal agrees to charge a battery of the mobile terminal in the quick charging mode. The communication control circuit is further configured to transmit a reply instruction of the first instruction to the power adapter, and the reply instruction of the first instruction is configured to indicate that the mobile terminal agrees to charge the battery in the quick charging mode. The communication control circuit is further configured to conduct a handshake communication with the power adapter via a second instruction transmitted by the power adapter to determine a charging voltage of the quick charging mode, conduct a handshake communication with the power adapter via a third instruction transmitted by the power adapter to determine a charging current of the quick charging mode, and conduct a handshake communication with the power adapter via a fourth instruction transmitted by the power adapter when the power adapter adjusts an output voltage and an output current of the power adapter to be the charging voltage and the charging current of the quick charging mode and enters a constant current phase, so as to cause the power adapter to adjust the output current to charge the battery in a multi-stage constant current mode via the charging circuit.

In a fourth aspect, a power adapter is provided. The power adapter is coupled to a mobile terminal via a USB interface. A power line of the USB interface is used for the power adapter to charge a battery of the mobile terminal, and data lines of the USB interface are used for communication between the power adapter and the mobile terminal. The power adapter supports a normal charging mode and a quick charging mode, and a charging speed of the quick charging mode is greater than that of the normal charging mode. The power adapter comprises a charging circuit and a communication control circuit. The communication control circuit is configured to activate a quick charging communication process when the power adapter receives indication information for indicating that the mobile terminal has recognized a type of the power adapter from the mobile terminal, and transmit a first instruction to the mobile terminal, wherein the first instruction is configured to query whether the mobile terminal agrees to charge the battery in the quick charging mode. The communication control circuit is further configured to receive a reply instruction of the first instruction from the mobile terminal, and the reply instruction of the first instruction is configured to indicate that the mobile terminal agrees to charge the battery in the quick charging mode. The communication control circuit is further configured to conduct a handshake communication with the mobile terminal via a second instruction to determine a charging voltage of the quick charging mode, conduct a handshake communication with the mobile terminal via a third instruction to determine a charging current of the quick charging mode, adjust an output voltage and an output current of the power adapter to be the charging voltage and the charging current of the quick charging mode to enter a constant current phase, and conduct a handshake communication with the mobile terminal via a fourth instruction during the constant current phase to adjust the output current of the power adapter, so as to charge the mobile terminal in a multi-stage constant current mode via the charging circuit.

In embodiments of the present disclosure, the power adapter does not increase the charging current blindly to implement quick charging, but negotiates with the mobile terminal via the bidirectional communication with the mobile terminal to determine whether or not the quick charging mode can be adopted. Comparing with the present technology, the security of the quick charging process is improved.

BRIEF DESCRIPTION OF DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Those skilled in the art can obtain other accompanying drawings according to the described accompanying drawings without creative work.

DETAILED DESCRIPTION

Figure 1:
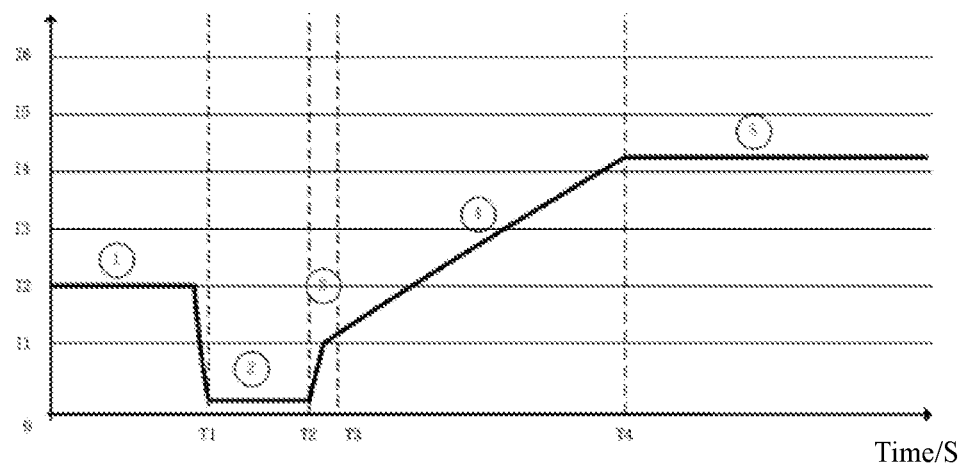
FIG. 1 is a schematic diagram of a quick charging process in accordance with an embodiment of the present disclosure.

In combination with the first aspect, in an implementation manner of the first aspect, the reply instruction of the first instruction comprises multiple bits, and the multiple bits comprise a bit configured to indicate whether the mobile terminal agrees to activate the quick charging mode, and a bit configured to indicate a path impedance of the mobile terminal. The path impedance of the mobile terminal is used for the power adapter to determine whether the USB interface is in good contact.

In combination with the first aspect or any of the above implementation manners, in another implementation manner of the first aspect, a format of the reply instruction of the first instruction is 101XYYYYYY, X indicates 1 bit, Y indicates 1 bit, X=1 indicates that the mobile terminal agrees to activate the quick charging mode, X=0 indicates that the mobile terminal disagrees to activate the quick charging mode, and the path impedance of the mobile terminal equals to YYYYYY*5 mΩ.

In combination with the first aspect or any of the above implementation manners, in another implementation manner of the first aspect, the first instruction is 10101000 or 0×A8.

In combination with the first aspect or any of the above implementation manners, in another implementation manner of the first aspect, conducting, by the mobile terminal, the handshake communication with the power adapter via the second instruction transmitted by the power adapter to determine the charging voltage of the quick charging mode comprises: receiving, by the mobile terminal, the second instruction from the power adapter, the second instruction being configured to query whether the current output voltage of the power adapter is proper to be the charging voltage of the quick charging mode; and transmitting, by the mobile terminal, a reply instruction of the second instruction to the power adapter, the reply instruction of the second instruction being configured to indicate that the current output voltage of the power adapter is proper, high, or low, so as to cause the power adapter to determine the charging voltage of the quick charging mode according to the reply instruction of the second instruction.

In combination with the first aspect or any of the above implementation manners, in another implementation manner of the first aspect, a format of the reply instruction of the second instruction is 1010XX0000, X indicates 1 bit, XX=11 indicates that the current output voltage of the power adapter is proper, XX=10 indicates that the current output voltage of the power adapter is high, XX=01 indicates that the current output voltage of the power adapter is low.

In combination with the first aspect or any of the above implementation manners, in another implementation manner of the first aspect, the second instruction is 10100100 or 0×A4.

In combination with the first aspect or any of the above implementation manners, in another implementation manner of the first aspect, conducting, by the mobile terminal, the handshake communication with the power adapter via the third instruction transmitted by the power adapter to determine the charging current of the quick charging mode comprises: receiving, by the mobile terminal, the third instruction from the power adapter, the third instruction being configured to query a maximum charging current which is currently supported by the mobile terminal; and transmitting, by the mobile terminal, a reply instruction of the third instruction to the power adapter, the reply instruction of the third instruction being configured to indicate the maximum charging current which is currently supported by the mobile terminal, so as to cause the power adapter to determine the charging current of the quick charging mode according to the reply instruction of the third instruction.

In combination with the first aspect or any of the above implementation manners, in another implementation manner of the first aspect, the reply instruction of the third instruction comprises multiple bits, and the multiple bits of the reply instruction of the third instruction comprise a bit configured to indicate the maximum charging current which is currently supported by the mobile terminal.

In combination with the first aspect or any of the above implementation manners, in another implementation manner of the first aspect, a format of the reply instruction of the third instruction is 1010XXXXXX, X indicates 1 bit, and the maximum charging current which is currently supported by the mobile terminal equals to 3000+(XXXXXX*250)mA.

In combination with the first aspect or any of the above implementation manners, in another implementation manner of the first aspect, the third instruction is 10100110 or 0×A6.

In combination with the first aspect or any of the above implementation manners, in another implementation manner of the first aspect, conducting, by the mobile terminal, the handshake communication with the power adapter via the fourth instruction transmitted by the power adapter so as to cause the power adapter to adjust the current output current comprises: receiving, by the mobile terminal, the fourth instruction from the power adapter during the constant current phase, the fourth instruction being configured to query a current voltage of the battery of the mobile terminal; and transmitting, by the mobile terminal, a reply instruction of the fourth instruction for indicating the current voltage of the battery of the mobile terminal to the power adapter, so as to cause the power adapter to adjust the current output current of the power adapter according to the current voltage of the battery.

In combination with the first aspect or any of the above implementation manners, in another implementation manner of the first aspect, the reply instruction of the fourth instruction comprises multiple bits, and the multiple bits of the reply instruction of the fourth instruction comprise a bit configured to indicate the current voltage of the battery, and a bit configured to indicate whether the battery is being charged.

In combination with the first aspect or any of the above implementation manners, in another implementation manner of the first aspect, a format of the reply instruction of the fourth instruction is 101XYYYYYY, X indicates 1 bit, Y indicates 1 bit, X=1 indicates that the battery is being charged, X=0 indicates that the battery is not charged, the current voltage of the battery equals to 3404+(YYYYYY*16) mV.

In combination with the first aspect or any of the above implementation manners, in another implementation manner of the first aspect, the fourth instruction is 10100010 or 0×A2.

In combination with the first aspect or any of the above implementation manners, in another implementation manner of the first aspect, the method further comprises: transmitting, by the mobile terminal, information for indicating a path impedance of the mobile terminal to the power adapter, so as to cause the power adapter to determine whether the USB interface is in bad contact according to the path impedance during the constant current phase; and receiving, by the mobile terminal, a fifth instruction from the power adapter when the power adapter determines that the USB interface is in bad contact, the fifth instruction being configured to indicate that the USB interface is in bad contact and the power adapter is ready to exit the quick charging mode or reactivate the quick charging communication process.

In combination with the first aspect or any of the above implementation manners, in another implementation manner of the first aspect, the fifth instruction is 10110010 or 0×B2.

In combination with the first aspect or any of the above implementation manners, in another implementation manner of the first aspect, the method further comprises: executing, by the mobile terminal, at least one of following operations when the power adapter determines that a reply instruction received from the mobile terminal has an encoding error, and the following operations comprises: exiting the quick charging mode, stopping charging, or reactivating the quick charging communication process.

In combination with the first aspect or any of the above implementation manners, in another implementation manner of the first aspect, an instruction transmitted from the mobile terminal to the power adapter comprises multiple bits, before the mobile terminal transmits any instruction, the mobile terminal firstly transmits the most significant bit of multiple bits of the any instruction; or an instruction received from the power adapter by the mobile terminal comprises multiple bits, when the mobile terminal receives an instruction, the mobile terminal firstly receives the most significant bit of multiple bits of the instruction.

In combination with the first aspect or any of the above implementation manners, in another implementation manner of the first aspect, clock signals used in the communication between the power adapter and the mobile terminal are provided by the power adapter.

In combination with the first aspect or any of the above implementation manners, in another implementation manner of the first aspect, an instruction transmitted from the power adapter to the mobile terminal comprises multiple bits, during a process of transmitting each of the multiple bits, the power adapter firstly transmits each bit, and then transmits a clock interrupt signal; or a reply instruction received from the mobile terminal by the power adapter comprises multiple bits, during a process of receiving each of the multiple bits, the power adapter firstly transmits the clock interrupt signal, and then receives each bit after a preset time interval.

In combination with the first aspect or any of the above implementation manners, in another implementation manner of the first aspect, each instruction transmitted from the power adapter to the mobile terminal comprises an 8-bit data, the power adapter transmits the 8-bit data to the mobile terminal via eight continuous clock periods of the clock signal, level of previous 10 μs of each of the eight continuous clock periods is low level, and level of latter 500 μs of each of the eight continuous clock periods is high level; or each reply instruction received from the mobile terminal by the power adapter comprises a 10-bit data, the power adapter receives the 10-bit data from the mobile terminal via ten continuous clock periods of the clock signal, level of previous 500 μs of each of the ten continuous clock periods is high level, and level of latter 10 μs of each of the ten continuous clock periods is low level.

In combination with the first aspect or any of the above implementation manners, in another implementation manner of the first aspect, during a process that the power adapter receives an instruction from the mobile terminal, a minimum value of high level of the clock signal equals to VDD of the power adapter minus 0.7V; or during the process that the power adapter receives an instruction from the mobile terminal, a maximum value of low level of the clock signal is 0.8V; or during a process that the power adapter transmits an instruction to the mobile terminal, the minimum value of the high level of the clock signal equals to 0.25 VDD+0.8V; or during the process that the power adapter transmits an instruction to the mobile terminal, a maximum value of the high level of the clock signal is 4.5V; or during the process that the power adapter transmits an instruction to the mobile terminal, the maximum value of the low level of the clock signal is 0.15 VDD; the VDD is a work voltage of the power adapter, and/or the VDD is greater than 3.2V and less than 4.5V.

In combination with the first aspect or any of the above implementation manners, in another implementation manner of the first aspect, after the mobile terminal receives the clock interrupt signal, holding time of a data of an instruction transmitted from the power adapter to the mobile terminal is 500±5 μs.

In combination with the second aspect, in an implementation manner of the second aspect, the method further comprises: detecting, by the power adapter, a charging current provided to the mobile terminal by the power adapter; and determining, by the power adapter, that the mobile terminal has recognized the type of the power adapter when the power adapter does not receive the indication information and determines that within a preset time period the charging current provided to the mobile terminal by the power adapter is greater than or equals to a preset current threshold, activating, by the power adapter, the quick charging communication process, and transmitting, by the power adapter, the first instruction to the mobile terminal.

In combination with the second aspect or any of the above implementation manners, in another implementation manner of the second aspect, the reply instruction of the first instruction comprises multiple bits, and the multiple bits comprise a bit configured to indicate whether the mobile terminal agrees to activate the quick charging mode, and a bit configured to indicate a path impedance of the mobile terminal, and the path impedance of the mobile terminal is used for the power adapter to determine whether the USB interface is in good contact.

In combination with the second aspect or any of the above implementation manners, in another implementation manner of the second aspect, a format of the reply instruction of the first instruction is 101XYYYYYY, X indicates 1 bit, Y indicates 1 bit, X=1 indicates that the mobile terminal agrees to activate the quick charging mode, X=0 indicates that the mobile terminal disagrees to activate the quick charging mode, and the path impedance of the mobile terminal equals to YYYYYY*5 mΩ.

In combination with the second aspect or any of the above implementation manners, in another implementation manner of the second aspect, the first instruction is 10101000 or 0×A8.

In combination with the second aspect or any of the above implementation manners, in another implementation manner of the second aspect, conducting, by the power adapter, the handshake communication with the mobile terminal via the second instruction to determine the charging voltage of the quick charging mode comprises: transmitting, by the power adapter, the second instruction to the mobile terminal, the second instruction being configured to query whether the current output voltage of the power adapter is proper to be the charging voltage of the quick charging mode; receiving, by the power adapter, a reply instruction of the second instruction from the mobile terminal, the reply instruction of the second instruction being configured to indicate that the current output voltage of the power adapter is proper, high, or low; determining, by the power adapter, the current output voltage of the power adapter to be the charging voltage of the quick charging mode when the reply instruction of the second instruction indicates that the current output voltage of the power adapter is proper; and adjusting, by the power adapter, the current output voltage of the power adapter according to the reply instruction of the second instruction when the reply instruction of the second instruction indicates that the current output voltage of the power adapter is high or low, repeating, by the power adapter, the handshake communication based on the second instruction to constantly adjust the current output voltage of the power adapter until the rely instruction of the second instruction indicates that the current output voltage of the power adapter is proper.

In combination with the second aspect or any of the above implementation manners, in another implementation manner of the second aspect, the reply instruction of the second instruction comprises multiple bits, the multiple bits of the reply instruction of the second instruction comprise a bit configured to indicate whether the current output voltage of the power adapter is proper, high, or low.

In combination with the second aspect or any of the above implementation manners, in another implementation manner of the second aspect, a format of the reply instruction of the second instruction is 1010XX0000, X indicates 1 bit, XX=11 indicates that the current output voltage of the power adapter is proper, XX=10 indicates that the current output voltage of the power adapter is high, XX=01 indicates that the current output voltage of the power adapter is low.

In combination with the second aspect or any of the above implementation manners, in another implementation manner of the second aspect, the second instruction is 10100100 or 0×A4.

In combination with the second aspect or any of the above implementation manners, in another implementation manner of the second aspect, conducting, by the power adapter, the handshake communication with the mobile terminal via the third instruction to determine the charging current of the quick charging mode comprises: transmitting, by the mobile terminal, the third instruction to the mobile terminal, the third instruction being configured to query a maximum charging current which is currently supported by the mobile terminal; receiving, by the power adapter, a reply instruction of the third instruction from the mobile terminal, the reply instruction of the third instruction being configured to indicate the maximum charging current which is currently supported by the mobile terminal; and determining, by the power adapter, the charging current of the quick charging mode according to the reply instruction of the third instruction.

In combination with the second aspect or any of the above implementation manners, in another implementation manner of the second aspect, the reply instruction of the third instruction comprises multiple bits, and the multiple bits of the reply instruction of the third instruction comprise a bit configured to indicate the maximum charging current which is currently supported by the mobile terminal.

In combination with the second aspect or any of the above implementation manners, in another implementation manner of the second aspect, a format of the reply instruction of the third instruction is 1010XXXXXX, X indicates 1 bit, the maximum charging current which is currently supported by the mobile terminal equals to 3000+(XXXXXX*250)mA.

In combination with the second aspect or any of the above implementation manners, in another implementation manner of the second aspect, the third instruction is 10100110 or 0×A6.

In combination with the second aspect or any of the above implementation manners, in another implementation manner of the second aspect, conducting, by the power adapter, the handshake communication with the mobile terminal via the fourth instruction during the constant current phase to adjust the current output current of the power adapter comprises: transmitting, by the power adapter, the fourth instruction to the mobile terminal during the constant current phase, the fourth instruction being configured to query a current voltage of the battery of the mobile terminal; and receiving, by the power adapter, a reply instruction of the fourth instruction from the mobile terminal, the reply instruction of the fourth instruction being configured to indicate the current voltage of the battery of the mobile terminal; and adjusting, by the power adapter, the current output current of the power adapter according to the current voltage of the battery.

In combination with the second aspect or any of the above implementation manners, in another implementation manner of the second aspect, the reply instruction of the fourth instruction comprises multiple bits, and the multiple bits of the reply instruction of the fourth instruction comprise a bit configured to indicate the current voltage of the battery, and a bit configured to indicate whether the battery is being charged.

In combination with the second aspect or any of the above implementation manners, in another implementation manner of the second aspect, a format of the reply instruction of the fourth instruction is 101XYYYYYY, X indicates 1 bit, Y indicates 1 bit, X=1 indicates that the battery is being charged, X=0 indicates that the battery is not charged, the current voltage of the battery equals to 3404+(YYYYYY*16)mV.

In combination with the second aspect or any of the above implementation manners, in another implementation manner of the second aspect, the fourth instruction is 10100010 or 0×A2.

In combination with the second aspect or any of the above implementation manners, in another implementation manner of the second aspect, the method further comprises: receiving, by the power adapter, information for indicating a path impedance of the mobile terminal from the mobile terminal; determining, by the power adapter, an impedance of a charging circuit from the power adapter to the battery according to the current output voltage of the power adapter and the current voltage of the battery during the constant current phase; determining, by the power adapter, whether the USB interface is in bad contact according to the impedance of the charging circuit, the path impedance of the mobile terminal, and a path impedance of a charging circuit between the power adapter and the mobile terminal; and when the USB interface being in bad contact, exiting, by the power adapter, the quick charging mode, or redetermining, by the power adapter, whether to activate the quick charging mode.

In combination with the second aspect or any of the above implementation manners, in another implementation manner of the second aspect, the method further comprises: transmitting, by the power adapter, a fifth instruction to the mobile terminal when the USB interface is in bad contact, the fifth instruction being configured to indicate that the USB interface is in bad contact and the power adapter is ready to exit the quick charging mode or redetermine whether to activate the quick charging mode.

In combination with the second aspect or any of the above implementation manners, in another implementation manner of the second aspect, the fifth instruction is 10110010 or 0×B2.

In combination with the second aspect or any of the above implementation manners, in another implementation manner of the second aspect, the method further comprises: executing, by the power adapter, at least one of following operations when the power adapter determines that a reply instruction received from the mobile terminal has an encoding error, and the following operations comprises: exiting the quick charging mode, stopping charging, or reactivating the quick charging communication process.

In combination with the second aspect or any of the above implementation manners, in another implementation manner of the second aspect, an instruction transmitted from the power adapter to the mobile terminal comprises multiple bits, when the power adapter transmits any instruction, the power adapter firstly transmits the most significant bit of multiple bits of the any instruction; or an instruction received from the mobile terminal by the power adapter comprises multiple bits, when the power adapter receives an instruction, the power adapter firstly receives the most significant bit of multiple bits of the instruction.

In combination with the second aspect or any of the above implementation manners, in another implementation manner of the second aspect, clock signals or clock interrupt signals used in the communication between the power adapter and the mobile terminal are provided by the power adapter.

In combination with the second aspect or any of the above implementation manners, in another implementation manner of the second aspect, an instruction transmitted from the power adapter to the mobile terminal comprises multiple bits, during a process of transmitting each of the multiple bits, the power adapter firstly transmits each bit, and then transmits the clock interrupt signal; or a reply instruction received from the mobile terminal by the power adapter comprises multiple bits, during a process of receiving each of the multiple bits, the power adapter firstly transmits the clock interrupt signal, and then receives each bit after a preset time interval.

In combination with the second aspect or any of the above implementation manners, in another implementation manner of the second aspect, each instruction transmitted from the power adapter to the mobile terminal comprises an 8-bit data, the power adapter transmits the 8-bit data to the mobile terminal via eight continuous clock periods of the clock signal, level of previous 10 μs of each of the eight continuous clock periods is low level, and level of latter 500 μs of each of the eight continuous clock periods is high level; or each reply instruction received from the mobile terminal by the power adapter comprises a 10-bit data, the power adapter receives the 10-bit data from the mobile terminal via ten continuous clock periods of the clock signal, level of previous 500 μs of each of the ten continuous clock periods is high level, and level of latter 10 μs of each of the ten continuous clock periods is low level.

In combination with the second aspect or any of the above implementation manners, in another implementation manner of the second aspect, during a process that the power adapter receives an instruction from the mobile terminal, a minimum value of high level of the clock signal equals to VDD of the power adapter minus 0.7V; or during the process that the power adapter receives an instruction from the mobile terminal, a maximum value of low level of the clock signal is 0.8V; or during a process that the power adapter transmits an instruction to the mobile terminal, the minimum value of the high level of the clock signal equals to 0.25 VDD+0.8V; or during the process that the power adapter transmits an instruction to the mobile terminal, a maximum value of the high level of the clock signal is 4.5V; or during the process that the power adapter transmits an instruction to the mobile terminal, the maximum value of the low level of the clock signal is 0.15 VDD; the VDD is a work voltage of the power adapter, and/or the VDD is greater than 3.2V and less than 4.5V.

In combination with the second aspect or any of the above implementation manners, in another implementation manner of the second aspect, after the mobile terminal receives the clock interrupt signal, holding time of a data of an instruction transmitted from the power adapter to the mobile terminal is 500±5 μs.

In combination with the third aspect, in an implementation manner of the third aspect, the reply instruction of the first instruction comprises multiple bits, and the multiple bits comprise a bit configured to indicate whether the mobile terminal agrees to activate the quick charging mode, and a bit configured to indicate a path impedance of the mobile terminal, and the path impedance of the mobile terminal is used for the power adapter to determine whether the USB interface is in good contact.

In combination with the third aspect or any of the above implementation manners, in another implementation manner of the third aspect, a format of the reply instruction of the first instruction is 101XYYYYYY, X indicates 1 bit, Y indicates 1 bit, X=1 indicates that the mobile terminal agrees to activate the quick charging mode, X=0 indicates that the mobile terminal disagrees to activate the quick charging mode, and the path impedance of the mobile terminal equals to YYYYYY*5 mΩ.

In combination with the third aspect or any of the above implementation manners, in another implementation manner of the third aspect, the first instruction is 10101000 or 0×A8.

In combination with the third aspect or any of the above implementation manners, in another implementation manner of the third aspect, the communication control circuit is configured to receive the second instruction from the power adapter, and the second instruction is configured to query whether the current output voltage of the power adapter is proper to be the charging voltage of the quick charging mode. The communication control circuit is further configured to transmit a reply instruction of the second instruction to the power adapter, and the reply instruction of the second instruction is configured to indicate that the current output voltage of the power adapter is proper, high, or low, so as to cause the power adapter to determine the charging voltage of the quick charging mode according to the reply instruction of the second instruction.

In combination with the third aspect or any of the above implementation manners, in another implementation manner of the third aspect, a format of the reply instruction of the second instruction is 1010XX0000, X indicates 1 bit, XX=11 indicates that the current output voltage of the power adapter is proper, XX=10 indicates that the current output voltage of the power adapter is high, XX=01 indicates that the current output voltage of the power adapter is low.

In combination with the third aspect or any of the above implementation manners, in another implementation manner of the third aspect, the second instruction is 10100100 or 0×A4.

In combination with the third aspect or any of the above implementation manners, in another implementation manner of the third aspect, the communication control circuit is configured to receive the third instruction from the power adapter, the third instruction is configured to query a maximum charging current which is currently supported by the mobile terminal; the communication control circuit is further configured to transmit a reply instruction of the third instruction for indicating the maximum charging current which is currently supported by the mobile terminal to the power adapter, so as to cause the power adapter to determine the charging current of the quick charging mode according to the reply instruction of the third instruction.

In combination with the third aspect or any of the above implementation manners, in another implementation manner of the third aspect, the reply instruction of the third instruction comprises multiple bits, and the multiple bits of the reply instruction of the third instruction comprise a bit configured to indicate the maximum charging current which is currently supported by the mobile terminal.

In combination with the third aspect or any of the above implementation manners, in another implementation manner of the third aspect, a format of the reply instruction of the third instruction is 1010XXXXXX, X indicates 1 bit, the maximum charging current which is currently supported by the mobile terminal equals to 3000+(XXXXXX*250)mA.

In combination with the third aspect or any of the above implementation manners, in another implementation manner of the third aspect, the third instruction is 10100110 or 0×A6.

In combination with the third aspect or any of the above implementation manners, in another implementation manner of the third aspect, the communication control circuit is configured to receive the fourth instruction from the power adapter during the constant current phase, and the fourth instruction is configured to query a current voltage of the battery of the mobile terminal. The communication control circuit is further configured to transmit a reply instruction of the fourth instruction for indicating the current voltage of the battery of the mobile terminal to the power adapter, so as to cause the power adapter to adjust the current output current of the power adapter according to the current voltage of the battery.

In combination with the third aspect or any of the above implementation manners, in another implementation manner of the third aspect, the reply instruction of the fourth instruction comprises multiple bits, and the multiple bits of the reply instruction of the fourth instruction comprise a bit configured to indicate the current voltage of the battery, and a bit configured to indicate whether the battery is being charged.

In combination with the third aspect or any of the above implementation manners, in another implementation manner of the third aspect, a format of the reply instruction of the fourth instruction is 101XYYYYYY, X indicates 1 bit, Y indicates 1 bit, X=1 indicates that the battery is being charged, X=0 indicates that the battery is not charged, the current voltage of the battery equals to 3404+(YYYYYY*16)mV.

In combination with the third aspect or any of the above implementation manners, in another implementation manner of the third aspect, the fourth instruction is 10100010 or 0×A2.

In combination with the third aspect or any of the above implementation manners, in another implementation manner of the third aspect, the communication control circuit is further configured to transmit information for indicating a path impedance of the mobile terminal to the power adapter, so as to cause the power adapter to determine whether the USB interface is in bad contact according to the path impedance during the constant current phase. The communication control circuit is further configured to receive a fifth instruction from power adapter when the power adapter determines that the USB interface is in bad contact, and the fifth instruction is configured to indicate that the USB interface is in bad contact and the power adapter is ready to exit the quick charging mode or reactivate the quick charging communication process.

In combination with the third aspect or any of the above implementation manners, in another implementation manner of the third aspect, the fifth instruction is 10110010 or 0×B2.

In combination with the third aspect or any of the above implementation manners, in another implementation manner of the third aspect, the communication control circuit is further configured to execute at least one of following operations when the power adapter determines that a reply instruction received from the mobile terminal has an encoding error, and the following operations comprise: exiting the quick charging mode, stopping charging, or reactivating the quick charging communication process.

In combination with the third aspect or any of the above implementation manners, in another implementation manner of the third aspect, an instruction transmitted from the mobile terminal to the power adapter comprises multiple bits, before the mobile terminal transmits any instruction, the mobile terminal firstly transmits the most significant bit of multiple bits of the any instruction; or an instruction received from the power adapter by the mobile terminal comprises multiple bits, when the mobile terminal receives an instruction, the mobile terminal firstly receives the most significant bit of multiple bits of the instruction.

In combination with the third aspect or any of the above implementation manners, in another implementation manner of the third aspect, clock signals used in the communication between the power adapter and the mobile terminal are provided by the power adapter.

In combination with the third aspect or any of the above implementation manners, in another implementation manner of the third aspect, an instruction transmitted from the power adapter to the mobile terminal comprises multiple bits, during a process of transmitting each of the multiple bits, the power adapter firstly transmits each bit, and then transmits a clock interrupt signal; or a reply instruction received from the mobile terminal by the power adapter comprises multiple bits, during a process of receiving each of the multiple bits, the power adapter firstly transmits the clock interrupt signal, and receives each bit after a preset time interval.

In combination with the third aspect or any of the above implementation manners, in another implementation manner of the third aspect, each instruction transmitted from the power adapter to the mobile terminal comprises an 8-bit data, the power adapter transmits the 8-bit data to the mobile terminal via eight continuous clock periods of the clock signal, level of previous 10 μs of each of the eight continuous clock periods is low level, and level of latter 500 μs of each of the eight continuous clock periods is high level; or each reply instruction received from the mobile terminal by the power adapter comprises a 10-bit data, the power adapter receives the 10-bit data from the mobile terminal via ten continuous clock periods of the clock signal, level of previous 500 μs of each of the ten continuous clock periods is high level, and level of latter 10 μs of each of the ten continuous clock periods is low level.

In combination with the third aspect or any of the above implementation manners, in another implementation manner of the third aspect, during a process that the power adapter receives an instruction from the mobile terminal, a minimum value of high level of the clock signal equals to VDD of the power adapter minus 0.7V; or during the process that the power adapter receives an instruction from the mobile terminal, a maximum value of low level of the clock signal is 0.8V; or during a process that the power adapter transmits an instruction to the mobile terminal, the minimum value of the high level of the clock signal equals to 0.25 VDD+0.8V; or during the process that the power adapter transmits an instruction to the mobile terminal, a maximum value of the high level of the clock signal is 4.5V; or during the process that the power adapter transmits an instruction to the mobile terminal, the maximum value of the low level of the clock signal is 0.15 VDD; the VDD is a work voltage of the power adapter, and/or the VDD is greater than 3.2V and less than 4.5V.

In combination with the third aspect or any of the above implementation manners, in another implementation manner of the third aspect, after the mobile terminal receives the clock interrupt signal, holding time of a data of an instruction transmitted from the power adapter to the mobile terminal is 500±5 μs.

In combination with the fourth aspect, in an implementation manner of the fourth aspect, the communication control circuit is further configured to detect a charging current provided to the mobile terminal by the power adapter, determine that the mobile terminal has recognized the type of the power adapter when the power adapter does not receive the indication information and determines that within a preset time period the charging current provided to the mobile terminal by the power adapter is greater than or equals to a preset current threshold, activate the quick charging communication process, and transmit the first instruction to the mobile terminal.

In combination with the fourth aspect or any of the above implementation manners, in another implementation manner of the fourth aspect, the reply instruction of the first instruction comprises multiple bits, and the multiple bits comprise a bit configured to indicate whether the mobile terminal agrees to activate the quick charging mode, and a bit configured to indicate a path impedance of the mobile terminal, the path impedance of the mobile terminal is used for the power adapter to determine whether the USB interface is in good contact.

In combination with the fourth aspect or any of the above implementation manners, in another implementation manner of the fourth aspect, a format of the reply instruction of the first instruction is 101XYYYYYY, X indicates 1 bit, Y indicates 1 bit, X=1 indicates that the mobile terminal agrees to activate the quick charging mode, X=0 indicates that the mobile terminal disagrees to activate the quick charging mode, and the path impedance of the mobile terminal equals to YYYYYY*5 mΩ.

In combination with the fourth aspect or any of the above implementation manners, in another implementation manner of the fourth aspect, the first instruction is 10101000 or 0×A8.

In combination with the fourth aspect or any of the above implementation manners, in another implementation manner of the fourth aspect, the communication control circuit is configured to transmit the second instruction to the mobile terminal, and the second instruction is configured to query whether the current output voltage of the power adapter is proper to be the charging voltage of the quick charging mode. The communication control circuit is further configured to receive a reply instruction of the second instruction from the mobile terminal, and the reply instruction of the second instruction is configured to indicate that the current output voltage of the power adapter is proper, high, or low. The communication control circuit is further configured to determine the current output voltage of the power adapter to be the charging voltage of the quick charging mode when the reply instruction of the second instruction indicates that the current output voltage of the power adapter is proper, adjust the current output voltage of the power adapter according to the reply instruction of the second instruction when the reply instruction of the second instruction indicates that the current output voltage of the power adapter is high or low, and repeat the handshake communication based on the second instruction to constantly adjust the current output voltage of the power adapter until the rely instruction of the second instruction indicates that the current output voltage of the power adapter is proper.

In combination with the fourth aspect or any of the above implementation manners, in another implementation manner of the fourth aspect, the reply instruction of the second instruction comprises multiple bits, the multiple bits of the reply instruction of the second instruction comprise a bit configured to indicate that the current output voltage of the power adapter is proper, high, or low.

In combination with the fourth aspect or any of the above implementation manners, in another implementation manner of the fourth aspect, a format of the reply instruction of the second instruction is 1010XX0000, X indicates 1 bit, XX=11 indicates that the current output voltage of the power adapter is proper, XX=10 indicates that the current output voltage of the power adapter is high, XX=01 indicates that the current output voltage of the power adapter is low.

In combination with the fourth aspect or any of the above implementation manners, in another implementation manner of the fourth aspect, the second instruction is 10100100 or 0×A4.

In combination with the fourth aspect or any of the above implementation manners, in another implementation manner of the fourth aspect, the communication control circuit is configured to transmit the third instruction to the mobile terminal, and the third instruction is configured to query a maximum charging current which is currently supported by the mobile terminal. The communication control circuit is further configured to receive a reply instruction of the third instruction from the mobile terminal, and the reply instruction of the third instruction is configured to indicate the maximum charging current which is currently supported by the mobile terminal. The communication control circuit is further configured to determine the charging current of the quick charging mode according to the reply instruction of the third instruction.

In combination with the fourth aspect or any of the above implementation manners, in another implementation manner of the fourth aspect, the reply instruction of the third instruction comprises multiple bits, and the multiple bits of the reply instruction of the third instruction comprise a bit configured to indicate the maximum charging current which is currently supported by the mobile terminal.

In combination with the fourth aspect or any of the above implementation manners, in another implementation manner of the fourth aspect, a format of the reply instruction of the third instruction is 1010XXXXXX, X indicates 1 bit, the maximum charging current which is currently supported by the mobile terminal equals to 3000+(XXXXXX*250)mA.

In combination with the fourth aspect or any of the above implementation manners, in another implementation manner of the fourth aspect, the third instruction is 10100110 or 0×A6.

In combination with the fourth aspect or any of the above implementation manners, in another implementation manner of the fourth aspect, the communication control circuit is configured to transmit the fourth instruction to the mobile terminal during the constant current phase, and the fourth instruction is configured to query a current voltage of the battery of the mobile terminal. The communication control circuit is further configured to receive a reply instruction of the fourth instruction from the mobile terminal, and the reply instruction of the fourth instruction is configured to indicate the current voltage of the battery of the mobile terminal. The communication control circuit is further configured to adjust the output current of the power adapter according to the current voltage of the battery.

In combination with the fourth aspect or any of the above implementation manners, in another implementation manner of the fourth aspect, the reply instruction of the fourth instruction comprises multiple bits, and the multiple bits of the reply instruction of the fourth instruction comprise a bit configured to indicate the current voltage of the battery, and a bit configured to indicate whether the battery is being charged.

In combination with the fourth aspect or any of the above implementation manners, in another implementation manner of the fourth aspect, a format of the reply instruction of the fourth instruction is 101XYYYYYY, X indicates 1 bit, Y indicates 1 bit, X=1 indicates that the battery is being charged, X=0 indicates that the battery is not charged, the current voltage of the battery equals to 3404+(YYYYYY*16)mV.

In combination with the fourth aspect or any of the above implementation manners, in another implementation manner of the fourth aspect, the fourth instruction is 10100010 or 0×A2.

In combination with the fourth aspect or any of the above implementation manners, in another implementation manner of the fourth aspect, the communication control circuit is further configured to receive information for indicating a path impedance of the mobile terminal from the mobile terminal, determine an impedance of a charging circuit from the power adapter to the battery according to the current output voltage of the power adapter and the current voltage of the battery during the constant current phase, determine whether the USB interface is in bad contact according to the impedance of the charging circuit, the path impedance of the mobile terminal, and a path impedance of a charging circuit between the power adapter and the mobile terminal, and exit the quick charging mode or redetermine whether to activate the quick charging mode when the USB interface is in bad contact.

In combination with the fourth aspect or any of the above implementation manners, in another implementation manner of the fourth aspect, the communication control circuit is further configured to transmit a fifth instruction to the mobile terminal when the USB interface is in bad contact, and the fifth instruction is configured to indicate that the USB interface is in bad contact and the power adapter is ready to exit the quick charging mode or redetermine whether to activate the quick charging mode.

In combination with the fourth aspect or any of the above implementation manners, in another implementation manner of the fourth aspect, the fifth instruction is 10110010 or 0×B2.

In combination with the fourth aspect or any of the above implementation manners, in another implementation manner of the fourth aspect, the communication control circuit is further configured to execute at least one of following operations when the power adapter determines that a reply instruction received from the mobile terminal has an encoding error, and the following operations comprise: exiting the quick charging mode, stopping charging, or reactivating the quick charging communication process.

In combination with the fourth aspect or any of the above implementation manners, in another implementation manner of the fourth aspect, an instruction transmitted from the power adapter to the mobile terminal comprises multiple bits, when the power adapter transmits any instruction, the power adapter firstly transmits the most significant bit of multiple bits of the any instruction; or an instruction received from the mobile terminal by the power adapter comprises multiple bits, when the power adapter receives an instruction, the power adapter firstly receives the most significant bit of multiple bits of the instruction.

In combination with the fourth aspect or any of the above implementation manners, in another implementation manner of the fourth aspect, clock signals or clock interrupt signals used in the communication between the power adapter and the mobile terminal are provided by the power adapter.

In combination with the fourth aspect or any of the above implementation manners, in another implementation manner of the fourth aspect, an instruction transmitted from the power adapter to the mobile terminal comprises multiple bits, during a process of transmitting each of the multiple bits, the power adapter firstly transmits each bit, and then transmits the clock interrupt signal; or a reply instruction received from the mobile terminal by the power adapter comprises multiple bits, during a process of receiving each of the multiple bits, the power adapter firstly transmits the clock interrupt signal, and then receives each bit after a preset time interval.

In combination with the fourth aspect or any of the above implementation manners, in another implementation manner of the fourth aspect, each instruction transmitted from the power adapter to the mobile terminal comprises an 8-bit data, the power adapter transmits the 8-bit data to the mobile terminal via eight continuous clock periods of the clock signal, level of previous 10 μs of each of the eight continuous clock periods is low level, and level of latter 500 μs of each of the eight continuous clock periods is high level; or each reply instruction received from the mobile terminal by the power adapter comprises a 10-bit data, the power adapter receives the 10-bit data from the mobile terminal via ten continuous clock periods of the clock signal, level of previous 500 μs of each of the ten continuous clock periods is high level, and level of latter 10 μs of each of the ten continuous clock periods is low level.

In combination with the fourth aspect or any of the above implementation manners, in another implementation manner of the fourth aspect, during a process that the power adapter receives an instruction from the mobile terminal, a minimum value of high level of the clock signal equals to VDD of the power adapter minus 0.7V; or during the process that the power adapter receives an instruction from the mobile terminal, a maximum value of low level of the clock signal is 0.8V; or during a process that the power adapter transmits an instruction to the mobile terminal, the minimum value of the high level of the clock signal equals to 0.25 VDD+0.8V; or during the process that the power adapter transmits an instruction to the mobile terminal, a maximum value of the high level of the clock signal is 4.5V; or during the process that the power adapter transmits an instruction to the mobile terminal, the maximum value of the low level of the clock signal is 0.15 VDD; the VDD is a work voltage of the power adapter, and/or the VDD is greater than 3.2V and less than 4.5V.

In combination with the fourth aspect or any of the above implementation manners, in another implementation manner of the fourth aspect, after the mobile terminal receives the clock interrupt signal, holding time of a data of an instruction transmitted from the power adapter to the mobile terminal is 500±5 μs.

The technical solution of embodiments of the present disclosure will be described clearly and completely in combination with the accompanying drawings of the embodiments of the present disclosure. Obviously, the described embodiments are a part of embodiments of the present disclosure, and not all of the embodiments. According to the embodiments of the present disclosure, other embodiments obtained by those skilled in the art without creative work all fall within the protection scope of the present disclosure.

FIG. 1 is a schematic diagram of a quick charging process in accordance with an embodiment of the present disclosure.

As illustrated by FIG. 1, a quick charging communication process may include five phases.

Phase 1:

The mobile terminal can detect a type of the power adapter via a positive data (D+) line and a negative data (D−) line. When it is determined that the power adapter is a non-USB charging device, a current absorbed by the mobile terminal can be greater than a preset current threshold I2. When the power adapter determines that within a preset time length (for example, continuous T1 time length) an output current of the power adapter is greater than or equal to I2, the power adapter determines that the mobile terminal has recognized the type of the power adapter, and the power adapter activates a handshake communication between the power adapter and the mobile terminal. The power adapter transmits a first instruction to query whether the mobile terminal is to activate a quick charging mode.

When a reply instruction received from the mobile terminal by the power adapter indicates that the mobile terminal disagrees to activate the quick charging mode, the power adapter redetects the output current of the power adapter. When the output current of the power adapter is still greater than or equal to I2, the power adapter retransmits the request to query whether the mobile terminal is to activate the quick charging mode, and the above steps of the phase 1 are repeated until the mobile terminal agrees to activate the quick charging mode or the output current of the power adapter is no longer greater than or equal to I2.

When the mobile terminal agrees to activate quick charging, the quick charging communication process enters a phase 2.

Phase 2:

The power adapter can output different voltage level. The power adapter transmits a second instruction to query the mobile terminal for whether an output voltage of the power adapter is proper (that is, whether the output voltage is proper to be a charging voltage of the quick charging mode).

The mobile terminal transmits a reply to the power adapter to inform the power adapter that the output voltage of the power adapter is high, low, or proper. If the reply the power adapter received from the mobile terminal indicates that the output voltage of the power adapter is high or low, the power adapter selects another output voltage level, and retransmits the second instruction to the mobile terminal to requery the mobile terminal for whether the output voltage of the power adapter is proper.

The above steps of the phase 2 are repeated until the mobile terminal returns a reply to the power adapter to inform the power adapter that the output voltage of the power adapter is proper, and the quick charging communication process enters a phase 3.

Phase 3:

The power adapter transmits a third instruction to the mobile terminal to query a maximum charging current which is currently supported by the mobile terminal. The mobile terminal transmits a reply to the power adapter to inform the power adapter of the maximum charging current which is currently supported by the mobile terminal, and the quick charging communication process enters a phase 4.

Phase 4:

The power adapter sets the output current of the power adapter to be the maximum charging current which is currently supported by the mobile terminal, and the quick charging communication process enters a constant current phase, that is, a phase 5.

Phase 5:

After entering the constant current phase, the power adapter transmits a fourth instruction every a time interval to query a current voltage of a battery of the mobile terminal.

The mobile terminal can transmit a reply to the power adapter to inform the power adapter of the current voltage of the battery of the mobile terminal. The power adapter can determine whether a USB interface is in good contact and whether it is need to decrease the current charging current value of the mobile terminal according to the reply for indicating the current voltage of the battery of the mobile terminal. When the power adapter determines that the USB interface is in bad contact, the power adapter transmits a fifth instruction to the mobile terminal, and then resets to reenter the phase 1.

It can be understood that in the constant current phase the output current of the power adapter does not keep unchanged all the time. The constant current phase is a multi-stage constant current phase, that is, the output current of the power adapter keeps unchanged within a period.

The above quick charging communication process is finished based on negotiation between the power adapter and the mobile terminal, and safety of quick charging can be ensured.

Specifically, during the whole process, the power adapter acts as a host, and conducts a handshake communication with the mobile terminal actively. The power adapter firstly determines whether to activate the quick charging communication process. After activating the quick charging communication process, the host transmits an instruction to the mobile terminal. A condition that causes the power adapter to determine to activate the quick charging process is that the power adapter determines that within the preset time period the output current of the power adapter is greater than or equals to I2. When the power adapter determines that the condition is satisfied, the power adapter determines that the mobile terminal has recognized the type of the power adapter, that is, determines that the mobile terminal has recognized that the power adapter is a non-USB charging device (or has recognized that the power adapter is a standard charging device, and is not a non-standard charging device, such as a computer, or has recognized that the power adapter is not a computer, that is, the non-USB charging device can refer to any other type charging device except a computer). By means of such a detection manner, the power adapter can be acted as a host, and the quick charging communication process is simplified. However, this manner is similar to a blind detection manner, that is, the power adapter guesses that the mobile terminal has recognized the type of the power adapter. Adopting the blind detection manner, certain errors may occur. For example, if a standard charging current of some mobile terminals is I2(or about I2), the current detected by the power adapter may not be exactly right, and the power adapter determines that the charging current of such mobile terminals is less than I2, which may result in that such mobile terminals cannot activate quick charging communication all the time and have to adopt a standard charging method for charging.

Figure 2:
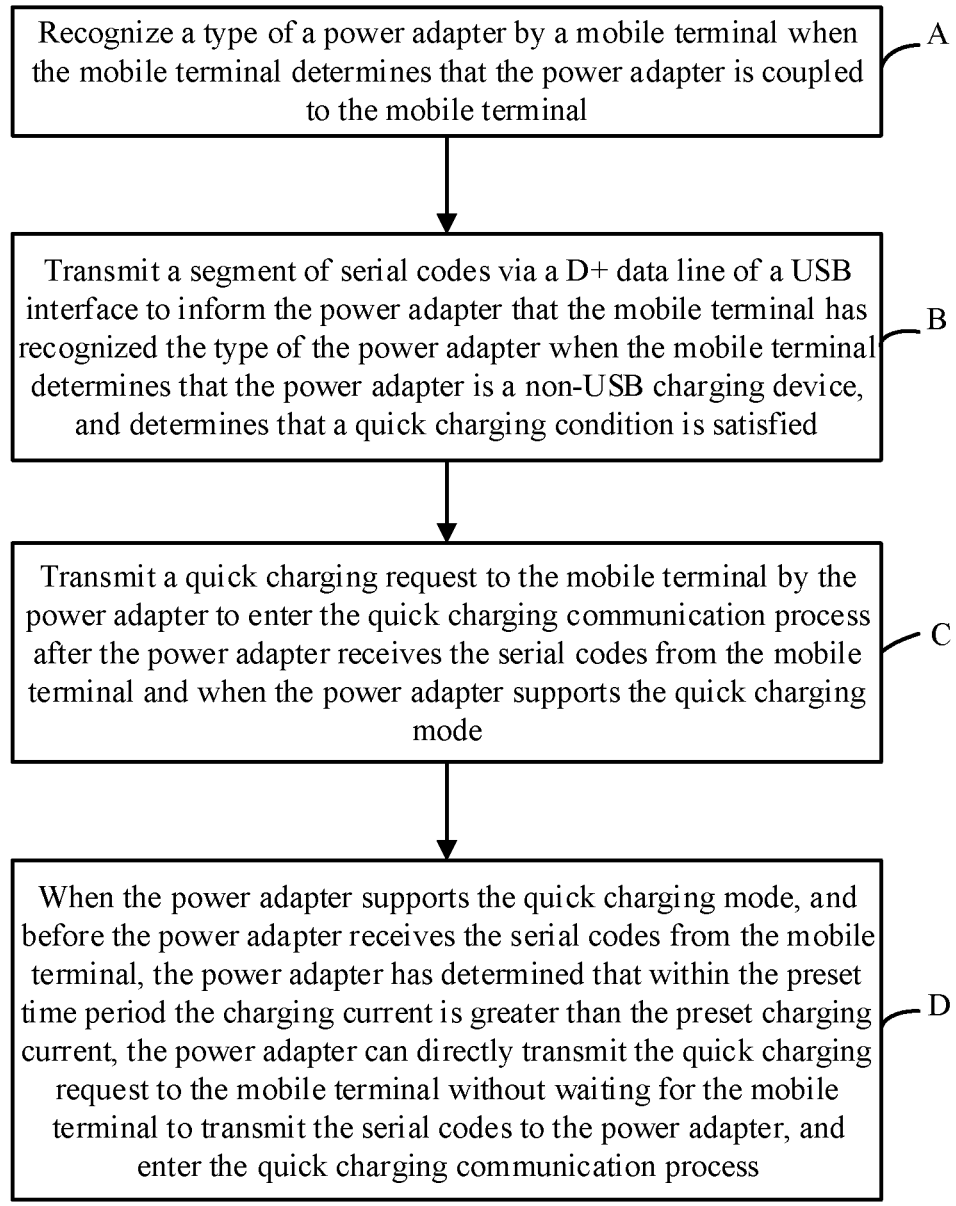
FIG. 2 is a schematic flow chart of a quick charging method in accordance with an embodiment of the present disclosure.

To avoid the above problems, the following will describe a quick charging method in accordance with another embodiment of the present disclosure in combination with FIG. 2. In the embodiment illustrated by FIG. 2, after the mobile terminal has recognized that the power adapter is a non-USB charging device, the mobile terminal transmits an indication message, for example, a segment of serial codes, to inform the power adapter that type recognition has finished, and inform the power adapter to activate the quick charging communication process. FIG. 2 includes following steps.

Step A: the mobile terminal recognizes the type of the power adapter when the mobile terminal determines that the power adapter is coupled to the mobile terminal.

Step B: when the mobile terminal determines that the power adapter is a non-USB charging device, and determines that a quick charging condition is satisfied, the mobile terminal transmits a segment of serial codes via the D+ data line of a USB interface to inform the power adapter that the mobile terminal has recognized the type of the power adapter.

According to a BC1.2 protocol, a main process of recognizing the type of the power adapter is that: when a high level signal is transmitted via the D+ and the high level signal can be received via the D−, it is determined that the power adapter is a standard charging device (non-USB charging device). In the embodiment of the present disclosure, the power adapter which can support the quick charging mode includes a micro controller unit (MCU), and during the charging process, the MCU communicates with the mobile terminal via the data lines of the USB interface. Thus, different from the BC1.2 protocol, the D+ and D− are not shorted. At this point, to cause the mobile terminal to correctly recognize the type of the power adapter, the voltage level of the D+ is set to be high. In the embodiment of the present disclosure, the serial codes can be transmitted via the D+.

Step C: when the power adapter supports the quick charging mode, after the power adapter receives the serial codes from the mobile terminal, the power adapter transmits a quick charging request to the mobile terminal to enter the quick charging communication process.

Step D: when the power adapter supports the quick charging mode, and before the power adapter receives the serial codes from the mobile terminal, the power adapter has determined that within the preset time period the charging current is greater than the preset charging current, the power adapter can directly transmit the quick charging request to the mobile terminal without waiting for the mobile terminal to transmit the serial codes to the power adapter, and enter the quick charging communication process.

Figure 3:
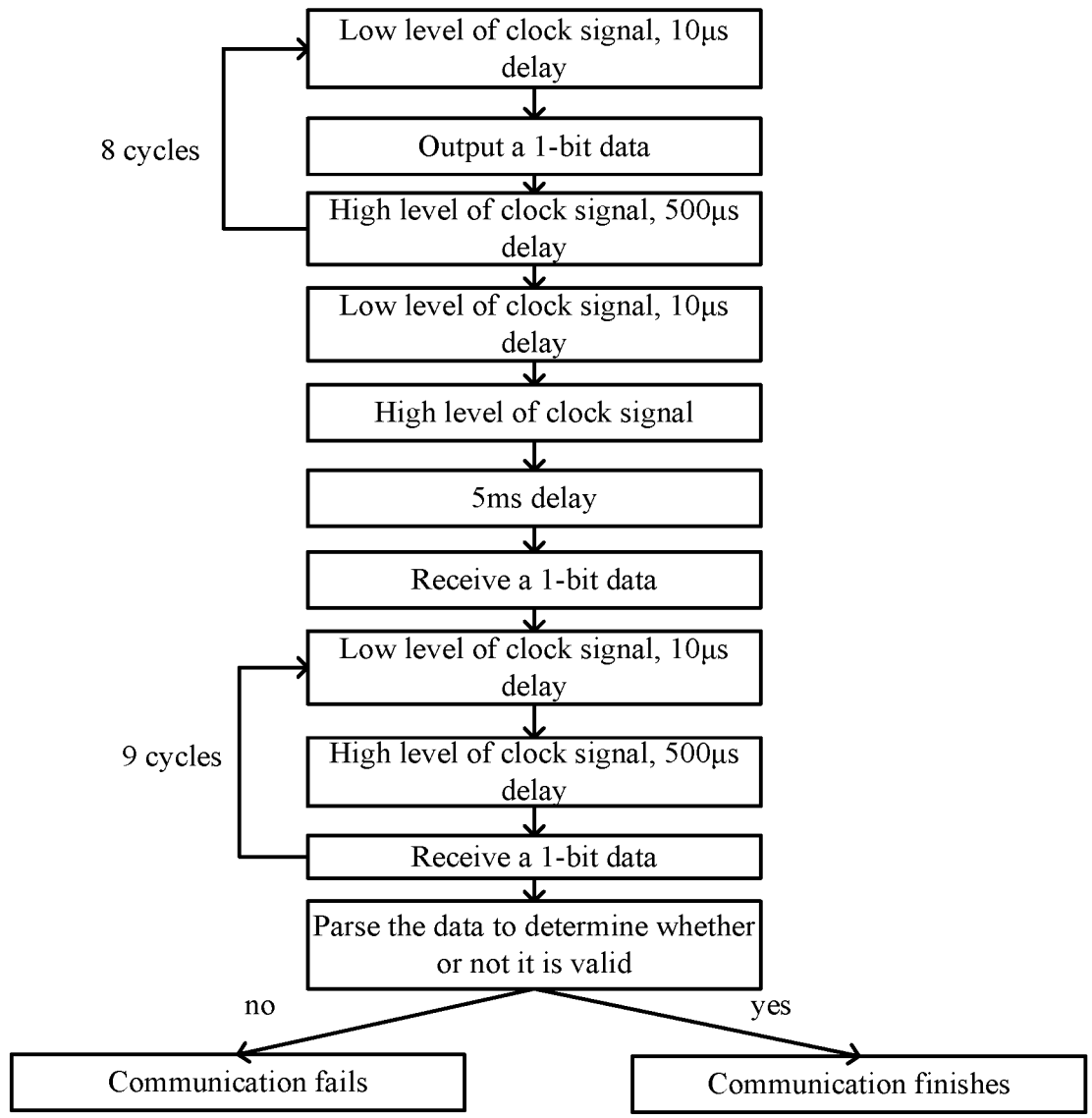
FIG. 3 is a schematic view showing that a power adapter implements a data reception and transmission in accordance with an embodiment of the present disclosure.
Figure 4:
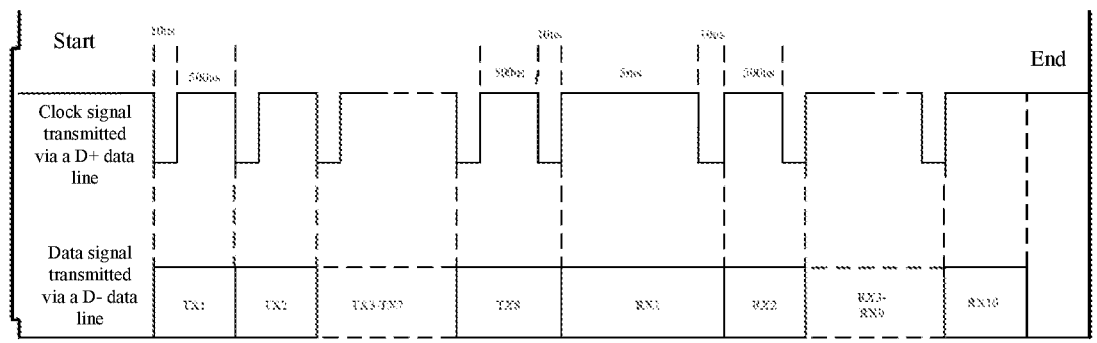
FIG. 4 is a schematic view of a communication sequence of a power adapter in accordance with an embodiment of the present disclosure.
Figure 5:
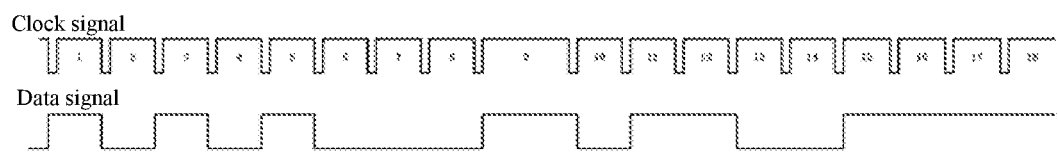
FIG. 5 is a schematic view of a communication sequence of a power adapter in accordance with an embodiment of the present disclosure.

The following will describe embodiments of the present disclosure more specifically in combination with detailed examples. It should be noted that examples of FIGS. 3-5 are just used to help those skilled in the art to understand the embodiments of the present disclosure, and not used to limit the embodiments of the present disclosure to detailed values or detailed scenarios which are illustrated in the examples. Apparently, those skilled in the art can make various equivalent modification or change according to the examples illustrated by FIGS. 3-5, and such modification or change shall fall within the scope of the embodiments of the present disclosure.

Firstly, a quick charging communication instruction set of the power adapter and the mobile terminal can be defined. For example, the quick charging communication instruction set is illustrated by the table 1.

TABLE 1

| Quick charging communication instruction set | | |
|---|---|---|
| Instruction 1: requesting for quick charging | | |
| Power adapter->Mobile terminal | 10101000 | 0xA8 |
| Mobile terminal->Power adapter | 101XYYYYYY | X: 1->Agree 0->Disagree, Path impedance = YYYYYY*5(mΩ) |
| Instruction 2: querying whether a voltage of the power adapter is proper | | |
| Power adapter->Mobile terminal | 10100100 | 0xA4 |
| Mobile terminal->Power adapter | 1010XX0000 | XX: 11->Proper 10->High 01->Low 00->Error |
| Instruction 3: querying for a maximum charging current which is currently supported by the mobile terminal | | |
| Power adapter->Mobile terminal | 10100110 | 0xA6 |
| Mobile terminal->Power adapter | 1010XXXXXX | Maximum charging current currently supported by the mobile terminal = 3000 + (XXXXXX*250)(mA) |
| Instruction 4: querying for a current voltage of a battery of the mobile terminal | | |
| Power adapter->Mobile terminal | 10100010 | 0xA2 |
| Mobile terminal->Power adapter | 101XYYYYYY | X: 1->Being charged 0->Uncharged, Battery voltage = 3404 + (YYYYYY*16)(mV) |
| Instruction 5: informing the mobile terminal that USB connection is poor and quick charging should be stopped | | |
| Power adapter->Mobile terminal | 10110010 | 0xB2 |
| Mobile terminal->Power adapter | NONE | |

From table 1, it can be seen that for each communication the power adapter firstly transmits an 8-bit data, and then the mobile terminal returns a 10-bit data. When the power adapter transmits a data, the power adapter can firstly transmit the most significant bit (MSB). Similarly, when the power adapter receives a data, the power adapter firstly receives the MSB. Clock signals for data transmission and data reception of the power adapter can be provided by the power adapter.

When the power adapter transmits a data, the power adapter transmits each bit of the data before transmitting a clock interrupt signal, which can guarantee the accuracy of the data received by the mobile terminal. When the power adapter receives a data, the power adapter can firstly transmit the clock interrupt signal, and then receive each bit of the data after a certain time, which can guarantee the accuracy and reliability of the data received by the power adapter.

FIG. 3 is a schematic view showing that the power adapter implements a data reception and data transmission in accordance with an embodiment of the present disclosure. For FIG. 3, there are a number of methods for parsing a data to determine whether the data is valid. For example, previous n bits of a data can be defined as 101 in advance. When previous 3 bits of a data received by the power adapter is not 101, the data is determined as an invalid data, and communication fails. Or, a received data is defined to include 10 bits in advance. If a received data does not include 10 bits, the received data is determined as an invalid data, and communication fails.

FIG. 4 is a schematic view of a communication sequence of the power adapter in accordance with an embodiment of the present disclosure. From FIG. 4, a relationship between a communication sequence indicated by the clock signals which are transmitted by the D+ data line and data signals transmitted by the D− data line. FIG. 5 shows a detailed example. In FIG. 5, after the power adapter transmits the instruction 10101000 to the mobile terminal, the power adapter receives the reply instruction 1011001111 from the mobile terminal.

Figure 6:
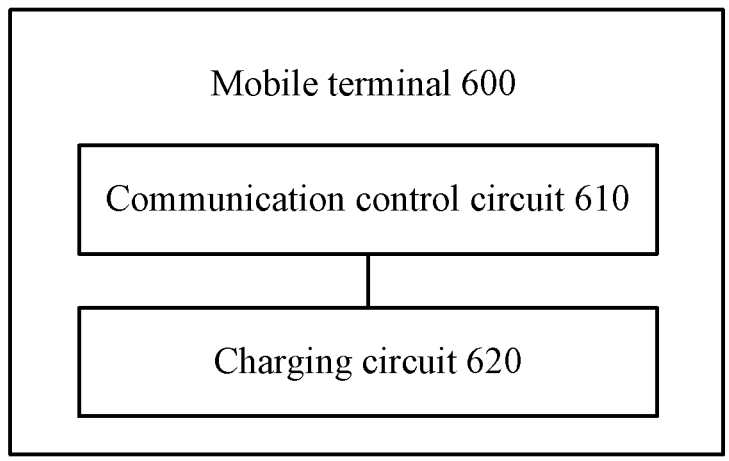
FIG. 6 is a diagrammatic view of a mobile terminal in accordance with an embodiment of the present disclosure.
Figure 7:
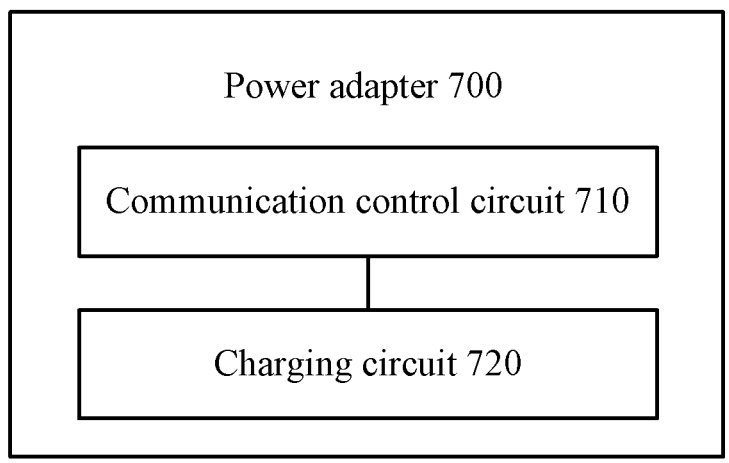
FIG. 7 is a diagrammatic view of a power adapter in accordance with an embodiment of the present disclosure.

In combination with FIGS. 6-7, the following will specifically describe the mobile terminal and the power adapter of the embodiments of the present disclosure. It can be understood that the mobile terminal of FIG. 6 can implement various functions described in the quick charging method, and the power adapter of FIG. 7 can implement various functions described in the quick charging method. To avoid repetition, detailed description will be omitted.

FIG. 6 is a diagrammatic view of a mobile terminal in accordance with an embodiment of the present disclosure. A mobile terminal 600 of FIG. 6 is coupled to a power adapter via a USB interface. A power line of the USB interface is used for charging a battery of the mobile terminal 600. Data lines of the USB interface are used for communication between the mobile terminal 600 and the power adapter. The mobile terminal 600 supports a normal charging mode and a quick charging mode, and a charging speed of the quick charging mode is greater than that of the normal charging mode. The mobile terminal 600 includes a communication control circuit 610 and a charging circuit 620.

The communication control circuit 610 is configured to determine a type of the power adapter when it is determined that the power adapter is coupled to the mobile terminal 600. When it is determined that the power adapter is a non-USB power adapter, the communication control circuit 610 transmits indication information, and the indication information is configured to indicate that the mobile terminal 600 has recognized the type of the power adapter and inform the power adapter to activate a quick charging communication process. After the power adapter activates the quick charging communication process, the communication control circuit 610 receives a first instruction from the power adapter, and the first instruction is configured to query the mobile terminal 600 whether the mobile terminal 600 agrees to charge the battery in the quick charging mode. The communication control circuit 610 transmits a reply instruction of the first instruction to the power adapter, and the reply instruction of the first instruction is configured to indicate that the mobile terminal 600 agrees to charge the battery in the quick charging mode. The communication control circuit 610 conducts a handshake communication with the power adapter via a second instruction transmitted by the power adapter to determine a charging voltage of the quick charging mode, and conducts a handshake communication with the power adapter via a third instruction transmitted by the power adapter to determine a charging current of the quick charging mode. After the power adapter adjusts an output voltage and output current of the power adapter to be the charging voltage and charging current of the quick charging mode and enters the constant current phase, the communication control circuit 610 conducts a handshake communication with the power adapter via a fourth instruction transmitted by the power adapter to cause the power adapter to adjust the output current and charge the battery in a multi-stage constant current mode via the charging circuit 620.

In embodiments of the present disclosure, the power adapter does not increase the charging current blindly for quick charging, but negotiates with the mobile terminal via communication with the mobile terminal to determine whether the quick charging mode can be adopted. Comparing with the present technology, the security of the quick charging process is improved.

Optionally, in an embodiment, the reply instruction of the first instruction includes multiple bits, and the multiple bits include a bit configured to indicate whether the mobile terminal 600 agrees to activate the quick charging mode, and a bit configured to indicate a path impedance of the mobile terminal 600. The path impedance of the mobile terminal 600 is used for the power adapter to determine whether the USB interface is in good contact.

Optionally, in an embodiment, a format of the reply instruction of the first instruction is 101XYYYYYY, X indicates 1 bit, and Y indicates 1 bit. X=1 indicates that the mobile terminal 600 agrees to activate the quick charging mode, X=0 indicates that the mobile terminal 600 does not agree to activate the quick charging mode, and the path impedance of the mobile terminal 600 equals to YYYYYY*5 mΩ.

Optionally, in an embodiment, the first instruction is 10101000 or 0×A8.

Optionally, in an embodiment, the communication control circuit 610 is configured to receive a second instruction from the power adapter, and the second instruction is configured to query whether the current output voltage of the power adapter is proper to be set to be the charging voltage of the quick charging mode. The communication control circuit 610 is configured to transmit a reply instruction of the second instruction to the power adapter, and the reply instruction of the second instruction is configured to indicate that the current output voltage of the power adapter is proper, high, or low, so as to cause the power adapter to determine the charging voltage of the quick charging mode according to the replay instruction of the second instruction.

Optionally, in an embodiment, a format of the reply instruction corresponding to the second instruction is 1010XX0000, X indicates 1 bit, XX=11 indicates that the current output voltage of the power adapter is proper, XX=10 indicates that the current output voltage of the power adapter is high, XX=01 indicates that the current output voltage of the power adapter is low.

Optionally, in an embodiment, the second instruction is 10100100 or 0×A4.

Optionally, in an embodiment, the communication control circuit 610 is configured to receive the third instruction from the power adapter, and the third instruction is configured to query a maximum charging current which is currently supported by the mobile terminal 600. The communication control circuit 610 is configured to transmit a reply instruction of the third instruction to the power adapter, and the reply instruction of the third instruction is configured to indicate the maximum charging current which is currently supported by the mobile terminal 600, so as to cause the power adapter to determine the charging current of the quick charging mode according to the reply instruction of the third instruction.

Optionally, in an embodiment, the reply instruction of the third instruction includes multiple bits, and the multiple bits of the reply instruction of the third instruction include a bit configured to indicate the maximum charging current which is currently supported by the mobile terminal 600.

Optionally, in an embodiment, a format of the reply instruction of the third instruction is 1010XXXXXX, and X indicates 1 bit. The maximum charging current which is currently supported by the mobile terminal equals to 3000+(XXXXXX*250)mA.

Optionally, in an embodiment, the third instruction is 10100110 or 0×A6.

Optionally, in an embodiment, the communication control circuit 610 is configured to receive the fourth instruction from the power adapter during the constant current phase, and the fourth instruction is configured to query the current voltage of the battery of the mobile terminal 600. The communication control circuit 610 is configured to transmit a reply instruction of the fourth instruction to the power adapter, and the reply instruction of the fourth instruction is configured to indicate the current voltage of the battery of the mobile terminal 600, so as to cause the power adapter to adjust the output current of the power adapter according to the current voltage of the battery.

Optionally, in an embodiment, the reply instruction of the fourth instruction includes multiple bits, and the multiple bits of the reply instruction of the fourth instruction include a bit configured to indicate the current voltage of the battery, and a bit configured to indicate whether the battery is being charged.

Optionally, in an embodiment, a format of the reply instruction of the fourth instruction is 101XYYYYYY, X indicates 1 bit, and Y indicates 1 bit. X=1 indicates that the battery is being charged, and X=0 indicates that the battery is not charged. The current voltage of the battery equals to 3404+(YYYYYY*16)mV.

Optionally, in an embodiment, the fourth instruction is 10100010 or 0×A2.

Optionally, in an embodiment, the communication control circuit 610 is further configured to transmit information for indicating a path impedance of the mobile terminal 600 to the power adapter, so as to cause the power adapter to determine whether the USB interface is in bad contact according to the path impedance during the constant current phase. When the power adapter determines that the USB interface is in bad contact, the communication control circuit 610 receives a fifth instruction from the power adapter, and the fifth instruction is configured to indicate that the USB interface is in bad contact and the power adapter is ready to exit the quick charging mode or reactivate the quick charging communication process.

Optionally, in an embodiment, the fifth instruction is 10110010 or 0×B2.

Optionally, in an embodiment, when the power adapter determines that the reply instruction received from the mobile terminal 600 has an encoding error, the communication control circuit 610 is further configured to execute at least one of following operations: exiting the quick charging mode, stopping charging, or reactivating the quick charging communication.

Optionally, in an embodiment, an instruction transmitted from the mobile terminal 600 to the power adapter includes multiple bits. Before the mobile terminal 600 transmits any instruction, the mobile terminal 600 firstly transmits the MSB of the multiple bits of the any instruction. Or, an instruction received from the power adapter by the mobile terminal 600 includes multiple bits. When the mobile terminal 600 receives a certain instruction, the mobile terminal 600 firstly receives the MSB of the multiple bits of the certain instruction.

Optionally, in an embodiment, the clock signals used in the communication between the power adapter and the mobile terminal are provided by the power adapter.

Optionally, in an embodiment, an instruction transmitted from the power adapter to the mobile terminal 600 includes multiple bits. During a process of transmitting each of the multiple bits, the power adapter firstly transmits each bit, and then transmits a clock interrupt signal. Or, a reply instruction received from the mobile terminal 600 by the power adapter includes multiple bits. During a process of receiving each of the multiple bits, the power adapter firstly transmits the clock interrupt signal, and then receives each bit after a preset time interval.

Optionally, in an embodiment, each instruction transmitted from the power adapter to the mobile terminal 600 includes an 8-bit data. The power adapter transmits the 8-bit data to the mobile terminal 600 via eight continuous clock periods of the clock signal. Level of previous 10 µs of each of the eight continuous clock periods is low level, and level of latter 500 µs of each of the eight continuous clock periods is high level. Or, each reply instruction received from the mobile terminal 600 by the power adapter includes a 10-bit data. The power adapter receives the 10-bit data from the mobile terminal 600 via ten continuous clock periods of the clock signal. Level of previous 500 µs of each of the ten continuous clock periods is high level, and level of latter 10 µs of each of the ten continuous clock periods is low level.

Optionally, in an embodiment, during a process that the power adapter receives an instruction from the mobile terminal 600, a minimum value of high level of the clock signal equals to VDD of the power adapter minus 0.7V. Or, during the process that the power adapter receives an instruction from the mobile terminal 600, a maximum value of low level of the clock signal is 0.8V. Or, during a process that the power adapter transmits an instruction to the mobile terminal 600, the minimum value of the high level of the clock signal equals to 0.25 VDD+0.8V. Or, during the process that the power adapter transmits an instruction to the mobile terminal 600, a maximum value of the high level of the clock signal is 4.5V. Or, during the process that the power adapter transmits an instruction to the mobile terminal 600, the maximum value of the low level of the clock signal is 0.15 VDD. The VDD is a work voltage of the power adapter, and/or the VDD is greater than 3.2V and less than 4.5V.

Optionally, in an embodiment, after the mobile terminal 600 receives the clock interrupt signal, holding time of a data of an instruction transmitted from the power adapter to the mobile terminal 600 is 500±5 µs.

FIG. 7 is a diagrammatic view of a power adapter in accordance with an embodiment of the present disclosure. A power adapter 700 of FIG. 7 is coupled to a mobile terminal via a USB interface. A power line of the USB interface is used for the power adapter 700 to charge a battery of the mobile terminal, and data lines of the USB interface are used for communication between the power adapter 700 and the mobile terminal. The power adapter 700 supports a normal charging mode and a quick charging mode, and a charging speed of the quick charging mode is greater than that of the normal charging mode. The power adapter 700 includes a communication control circuit 710 and a charging circuit 720.

The communication control circuit 710 is configured to activate a quick charging communication process when the power adapter 700 receives indication information for indicating that the mobile terminal has recognized a type of the power adapter 700 from the mobile terminal, and transmit a first instruction to the mobile terminal, and the first instruction is configured to query whether the mobile terminal agrees to charge the battery in the quick charging mode. The communication control circuit 710 is configured to receive a reply instruction of the first instruction from the mobile terminal, and the reply instruction of the first instruction is configured to indicate that the mobile terminal agrees to charge the battery in the quick charging mode. The communication control circuit 710 is configured to conduct a handshake communication with the mobile terminal via a second instruction to determine a charging voltage of the quick charging mode, conduct a handshake communication with the mobile terminal via a third instruction to determine a charging current of the quick charging mode, adjust an output voltage and an output current of the power adapter to be the charging voltage and the charging current of the quick charging mode to enter a constant current phase, and conduct a handshake communication with the mobile terminal via a fourth instruction during the constant current phase to adjust the output current of the power adapter 700, so as to charge the mobile terminal in a multi-stage constant current mode via the charging circuit 720.

In embodiments of the present disclosure, the power adapter 700 does not increase the charging current blindly for quick charging, but negotiates with the mobile terminal via communication with the mobile terminal to determine whether the quick charging mode can be adopted. Comparing with the present technology, the security of the quick charging process is improved.

Optionally, in an embodiment, the communication control circuit 710 is further configured to detect a charging current provided to the mobile terminal by the power adapter 700, determine that the mobile terminal has recognized the type of the power adapter 700 when the power adapter 700 does not receive the indication information and determines that within a preset time period the charging current provided to the mobile terminal by the power adapter 700 is greater than or equals to a preset current threshold, activate the quick charging communication process, and transmit the first instruction to the mobile terminal.

Optionally, in an embodiment, the reply instruction of the first instruction includes multiple bits, and the multiple bits include a bit configured to indicate whether the mobile terminal agrees to activate the quick charging mode, and a bit configured to indicate a path impedance of the mobile terminal. The path impedance of the mobile terminal is used for the power adapter 700 to determine whether the USB interface is in good contact.

Optionally, in an embodiment, a format of the reply instruction of the first instruction is 101XYYYYYY, X indicates 1 bit, and Y indicates 1 bit. X=1 indicates that the mobile terminal agrees to activate the quick charging mode, X=0 indicates that the mobile terminal disagrees to activate the quick charging mode, and the path impedance of the mobile terminal equals to YYYYYY*5 mΩ.

Optionally, in an embodiment, the first instruction is 10101000 or 0×A8.

Optionally, in an embodiment, the communication control circuit 710 is configured to transmit the second instruction to the mobile terminal, and the second instruction is configured to query whether a current output voltage of the power adapter 700 is proper to be the charging voltage of the quick charging mode. The communication control circuit 710 is configured to receive the reply instruction of the second instruction from the mobile terminal, and the reply instruction of the second instruction is configured to indicate that the current output voltage of the power adapter 700 is proper, high, or low. The communication control circuit 710 is configured to determine the current output voltage of the power adapter 700 to be the charging voltage of the quick charging mode when the reply instruction of the second instruction indicates that the current output voltage of the power adapter 700 is proper, adjust the current output voltage of the power adapter 700 according to the rely instruction of the second instruction when the reply instruction of the second instruction indicates that the current output voltage of the power adapter 700 is high or low, and repeat the handshake communication based on the second instruction to constantly adjust the current output voltage of the power adapter 700 until the rely instruction of the second instruction indicates that the current output voltage of the power adapter 700 is proper.

Optionally, in an embodiment, the reply instruction of the second instruction includes multiple bits, and the multiple bits of the reply instruction of the second instruction include a bit configured to indicate the current output voltage of the power adapter 700 is proper, high, or low.

Optionally, in an embodiment, a format of the reply instruction corresponding to the second instruction is 1010XX0000, X indicates 1 bit, XX=11 indicates that the current output voltage of the power adapter 700 is proper, XX=10 indicates that the current output voltage of the power adapter 700 is high, and XX=01 indicates that the current output voltage of the power adapter 700 is low.

Optionally, in an embodiment, the second instruction is 10100100 or 0×A4.

Optionally, in an embodiment, the communication control circuit 710 is configured to transmit the third instruction to the mobile terminal, and the third instruction is configured to query a maximum charging current which is currently supported by the mobile terminal. The communication control circuit 710 is configured to receive the reply instruction of the third instruction from the mobile terminal, and the reply instruction of the third instruction is configured to indicate the maximum charging current which is currently supported by the mobile terminal. The communication control circuit 710 is configured to determine the charging current of the quick charging mode according to the reply instruction of the third instruction.

Optionally, in an embodiment, the reply instruction of the third instruction includes multiple bits, and the multiple bits of the reply instruction of the third instruction include a bit configured to indicate the maximum charging current which is currently supported by the mobile terminal.

Optionally, in an embodiment, a format of the reply instruction of the third instruction is 1010XXXXXX, X indicates 1 bit, and the maximum charging current which is currently supported by the mobile terminal equals to 3000+(XXXXXX*250)mA.

Optionally, in an embodiment, the third instruction is 10100110 or 0×A6.

Optionally, in an embodiment, the communication control circuit 710 is configured to transmit the fourth instruction to the mobile terminal during the constant current phase, and the fourth instruction is configured to query a current voltage of the battery of the mobile terminal. The communication control circuit 710 is configured to receive the reply instruction of the fourth instruction from the mobile terminal, and the reply instruction of the fourth instruction is configured to indicate the current voltage of the battery of the mobile terminal. The communication control circuit 710 is configured to adjust the output current of the power adapter 700 according to the current voltage of the battery.

Optionally, in an embodiment, the reply instruction of the fourth instruction includes multiple bits, and the multiple bits of the reply instruction of the fourth instruction include a bit configured to indicate the current voltage of the battery, and a bit configured to indicate whether the battery is being charged.

Optionally, in an embodiment, a format of the reply instruction of the fourth instruction is 101XYYYYYY, X indicates 1 bit, Y indicates 1 bit, X=1 indicates that the battery is being charged, X=0 indicates that the battery is not charged, and the current voltage of the battery equals to 3404+(YYYYYY*16)mV.

Optionally, in an embodiment, the fourth instruction is 10100010 or 0×A2.

Optionally, in an embodiment, the communication control circuit 710 is further configured to receive impedance information for indicating a path impedance of the mobile terminal from the mobile terminal, determine an impedance of a charging circuit from the power adapter 700 to the battery according to the current output voltage of the power adapter 700 and the current voltage of the battery during the constant current phase, determine whether the USB interface is in bad contact according to the impedance of the charging circuit, the path impedance of the mobile terminal, and a path impedance of a charging circuit between the power adapter 700 and the mobile terminal, and exit the quick charging mode or redetermine whether to activate the quick charging mode when the USB interface is in bad contact.

Optionally, in an embodiment, the communication control circuit 710 is configured to transmit a fifth instruction to the mobile terminal when the USB interface is in bad contact. The fifth instruction is configured to indicate that the USB interface is in bad contact and the power adapter 700 is ready to exit the quick charging mode or redetermine whether to activate the quick charging mode.

Optionally, in an embodiment, the fifth instruction is 10110010 or 0×B2.

Optionally, in an embodiment, the communication control circuit 710 is further configured to execute at least one of following operations when the power adapter 700 determines that the reply instruction received from the mobile terminal has an encoding error, and the following operations includes: exiting the quick charging mode, stopping charging, or reactivating the quick charging communication process.

Optionally, in an embodiment, an instruction transmitted from the power adapter 700 to the mobile terminal includes multiple bits. When the power adapter transmits any instruction, the power adapter 700 firstly transmits the MSB of multiple bits of the any instruction. Or an instruction received from the mobile terminal by the power adapter 700 includes multiple bits. When the power adapter 700 receives an instruction, the power adapter 700 firstly receives the MSB of multiple bits of the instruction.

Optionally, in an embodiment, clock signals or clock interrupt signals used in the communication between the power adapter 700 and the mobile terminal are provided by the power adapter 700.

Optionally, in an embodiment, an instruction transmitted from the power adapter 700 to the mobile terminal includes multiple bits. During a process of transmitting each of the multiple bits, the power adapter 700 firstly transmits each bit, and then transmits the clock interrupt signal. Or a reply instruction received from the mobile terminal by the power adapter 700 includes multiple bits. During a process of receiving each of the multiple bits, the power adapter 700 firstly transmits the clock interrupt signal, and then receives each bit after a preset time interval.

Optionally, in an embodiment, each instruction transmitted from the power adapter 700 to the mobile terminal includes an 8-bit data. The power adapter 700 transmits the 8-bit data to the mobile terminal via eight continuous clock periods of the clock signal, level of previous 10 μs of each of the eight continuous clock periods is low level, and level of latter 500 μs of each of the eight continuous clock periods is high level. Or each reply instruction received from the mobile terminal by the power adapter 700 includes a 10-bit data, the power adapter 700 receives the 10-bit data from the mobile terminal via ten continuous clock periods of the clock signal, level of previous 500 μs of each of the ten continuous clock periods is high level, and level of latter 10 μs of each of the ten continuous clock periods is low level.

Optionally, in an embodiment, during a process that the power adapter 700 receives an instruction from the mobile terminal, a minimum value of high level of the clock signal equals to VDD of the power adapter 700 minus 0.7V. Or during the process that the power adapter 700 receives an instruction from the mobile terminal, a maximum value of low level of the clock signal is 0.8V. Or during a process that the power adapter 700 transmits an instruction to the mobile terminal, the minimum value of the high level of the clock signal equals to 0.25 VDD+0.8V. Or during the process that the power adapter 700 transmits an instruction to the mobile terminal, a maximum value of the high level of the clock signal is 4.5V. Or during the process that the power adapter 700 transmits an instruction to the mobile terminal, the maximum value of the low level of the clock signal is 0.15 VDD. The VDD is a work voltage of the power adapter 700, and/or the VDD is greater than 3.2V and less than 4.5V.

Optionally, in an embodiment, after the mobile terminal receives the clock interrupt signal, holding time of a data of an instruction transmitted from the power adapter 700 to the mobile terminal is 500±5 μs.

Those skilled in the art should appreciate that units and programming steps of various examples described in the embodiments of the present disclosure can be realized by electronic hardware or a combination of computer software and electronic hardware. Whether these functions are realized by hardware or software depends on particular applications and design constraint conditions. For each particular application, professionals can employ different methods to realize described functions, but this realization should fall into the scope of the present disclosure.

For convenience and simplicity, those skilled in the art can clearly understand that when the specific work processes of the above described systems, devices, and units are described, the corresponding processes of the above method embodiments can be referred, which will not be repeated herein.

In several embodiments provided by the present disclosure, it can be understood that the disclosed systems, devices, and methods can be implemented by other manners. For example, the device embodiments described above are only schematic. For example, the units are divided according to logic functions and can be divided by another manner in an actual implementation. For example, several units or assemblies can be combined or can be integrated into another system, or some features can be ignored, or are not executed. Another point is that mutual coupling or direct coupling or communication connection shown or discussed herein can be indirect coupling or communication connection through certain interfaces, devices, or units, and can be in the form of electricity, machine, or other.

The units illustrated as separate units can be or cannot be physically separated, and components shown in units can be or cannot be physical units, that is, can be in a place, or can be distributed in several network units. A part of or all of the units can be selected according to actual need to realize the purpose of the solution of the embodiments.

Additionally, various functional units in the embodiments of the present disclosure can be integrated into one processing unit, or various functional units can exist alone, or two or more units can be integrated into one unit.

If the functions can be realized in the form of software functional units and can be sold or used as stand-alone products, they can be stored in a computer-readable storage medium. Based on such understanding, the technical solution of the present disclosure or the part that contributes to the existing technology or a part of the technical solution can be embodied in the form of a software product. The computer software product can be stored in a storage medium, and include a plurality of instructions configured to direct a computer device (personal computer, server, or network device) to execute all of or a part of steps of various embodiments of the present disclosure. The storage mediums described above include a U disk, a mobile disk, a read-only memory (ROM), a random access memory (RAM), a disc, a compact disc, or other medium storing program codes.

The foregoing descriptions are merely preferred embodiments of the present disclosure, rather than limiting the present disclosure. Any one skilled in the art can easily make change or alterations within the technology range of the present disclosure, and those change or alterations shall fall within the protection scope of the present disclosure. Therefore, the protection scope of the present disclosure shall be limited by the protection scope of the claims.

What is claimed is:

1. A charging method comprising:
   detecting a charging current supplied from a power supply device to a terminal;
   determining that a type of the power supply device has been recognized when within a preset time period the charging current supplied from the power supply device to the terminal is greater than or equals to a preset current threshold;
   activating a charging communication process when the type of the power supply device has been recognized;
   conducting a handshake communication between the power supply device and the terminal to determine to charge the terminal in a quick charging mode; and
   when charging in the quick charging mode, conducting a handshake communication between the power supply device and the terminal to adjust an output voltage and an output current of the power supply device, so as to make the output voltage be proper for the terminal and to make the output current be corresponding to a maximum charging current supported by the terminal.

2. The method of claim 1, wherein conducting the handshake communication between the power supply device and the terminal to determine to charge the terminal in the quick charging mode comprises:
   transmitting an instruction to the terminal to query whether the terminal agrees to charge the terminal in the quick charging mode; and
   receiving a reply instruction from the terminal, wherein the reply instruction is indicative of charging the terminal in the quick charging mode.

3. The method of claim 1, wherein conducting the handshake communication between the power supply device and the terminal to adjust the output voltage of the power supply device comprises:
   transmitting an instruction to the terminal to query whether current output voltage of the power supply device is proper to be a charging voltage of the quick charging mode;
   receiving a reply instruction from the terminal, the reply instruction being indicative of whether the current output voltage of the power supply device is proper;
   determining the current output voltage of the power supply device to be the charging voltage of the quick charging mode when the reply instruction indicates that the current output voltage of the power supply device is proper; and
   adjusting the current output voltage of the power supply device according to the reply instruction when the reply instruction indicates that the current output voltage of the power supply device is high or low.

4. The method of claim 1, further comprising:
   transmitting an instruction to the terminal when charging in a constant current phase to query a current voltage of a battery of the terminal;
   receiving a reply instruction from the terminal, the reply instruction being indicative of the current voltage of the battery of the terminal; and
   adjusting the current output current of the power supply device according to the current voltage of the battery.

5. The method of claim 1, wherein:
   an instruction transmitted to the terminal contains a plurality of bits, wherein during a process of transmitting each of the plurality of bits, a clock interrupt signal is transmitted after transmission of one bit; and
   a reply instruction received from the terminal contains a plurality of bits, wherein during a process of receiving each of the plurality of bits, one bit is received after transmission of the clock interrupt signal.

6. The method of claim 1, wherein:
   each instruction transmitted to the terminal contains an 8-bit data, wherein the 8-bit data is transmitted to the terminal via eight continuous clock periods of a clock signal, and wherein level of previous 10 μs of each of the eight continuous clock periods is low level, and level of latter 500 μs is of each of the eight continuous clock periods is high level; and
   each reply instruction received from the terminal contains a 10-bit data, wherein the 10-bit data is received from the terminal via ten continuous clock periods of the clock signal, and wherein level of previous 500 μs is of each of the ten continuous clock periods is high level, and level of latter 10 μs of each of the ten continuous clock periods is low level.

7. A power supply device comprising:
   at least one processor; and
   a non-transitory computer readable memory, coupled to the at least one processor and storing at least one computer executable instruction therein which, when executed by the at least one processor, causes the at least one processor to:

detect a charging current supplied from the power supply device to a terminal;

determine that a type of the power supply device has been recognized when within a preset time period the charging current supplied from the power supply device to the terminal is greater than or equals to a preset current threshold;

activating a charging communication process when the type of the power supply device has been recognized;

conducting a handshake communication between the power supply device and the terminal to determine to charge the terminal in a quick charging mode; and when charging in the quick charging mode, conducting a handshake communication between the power supply device and the terminal to adjust an output voltage and an output current of the power supply device, so as to make the output voltage be proper for the terminal and to make the output current be corresponding to a maximum charging current supported by the terminal.

8. The power supply device of claim 7, wherein the at least one computer executable instruction causing the at least one processor to conduct the handshake communication between the power supply device and the terminal to determine to charge the terminal in the quick charging mode causes the at least one processor to:

transmit an instruction to the terminal to query whether the terminal agrees to charge the terminal in the quick charging mode; and receive a reply instruction from the terminal, wherein the reply instruction is indicative of charging the terminal in the quick charging mode.

9. The power supply device of claim 7, wherein the at least one computer executable instruction causing the at least one processor to conduct the handshake communication between the power supply device and the terminal to adjust the output voltage of the power supply device causes the at least one processor to:

transmit an instruction to the terminal to query whether current output voltage of the power supply device is proper to be a charging voltage of the quick charging mode;

receive a reply instruction from the terminal, the reply instruction being indicative of whether the current output voltage of the power supply device is proper;

determine the current output voltage of the power supply device to be the charging voltage of the quick charging mode when the reply instruction indicates that the current output voltage of the power supply device is proper; and adjust the current output voltage of the power supply device according to the reply instruction when the reply instruction indicates that the current output voltage of the power supply device is high or low.

10. The power supply device of claim 7, wherein the at least one computer executable instruction further causes the at least one processor to:

transmit an instruction to the terminal when charging in a constant current phase to query a current voltage of a battery of the terminal;

receive a reply instruction from the terminal, the reply instruction being indicative of the current voltage of the battery of the terminal; and adjust the current output current of the power supply device according to the current voltage of the battery.

11. A terminal comprising:

at least one processor; and a non-transitory computer readable memory, coupled to the at least one processor and storing at least one computer executable instruction therein which, when executed by the at least one processor, causes the at least one processor to:

determine that a type of a power supply device has been recognized when within a preset time period a charging current supplied from the power supply device to the terminal is greater than or equals to a preset current threshold;

conduct a handshake communication between the power supply device and the terminal to determine to charge the terminal in a quick charging mode upon activation of a charging communication process;

when charging in the quick charging mode, conduct a handshake communication between the power supply device and the terminal to adjust an output voltage and an output current of the power supply device, so as to make the output voltage be proper for the terminal and to make the output current be corresponding to a maximum charging current supported by the terminal.

12. The terminal of claim 11, wherein the at least one computer executable instruction causing the at least one processor to conduct the handshake communication between the power supply device and the terminal to determine to charge the terminal in the quick charging mode causes the at least one processor to:

receive an instruction from the power supply device, wherein the instruction is indicative of querying whether the terminal agrees to charge the terminal in the quick charging mode; and transmit a reply instruction to the power supply device, wherein the reply instruction is indicative of charging the terminal in the quick charging mode.

13. The terminal of claim 11, wherein the at least one computer executable instruction causing the at least one processor to conduct the handshake communication between the power supply device and the terminal to adjust the output voltage of the power supply device causes the at least one processor to:

receive an instruction from the power supply device, wherein the instruction is indicative of querying whether current output voltage of the power supply device is proper to be charging voltage of the quick charging mode; and transmit a reply instruction to the power supply device, the reply instruction being indicative of whether the current output voltage of the power supply device is proper, such that the power supply device determines the charging voltage of the quick charging mode according to the reply instruction.

* * * * *